US012682484B2

(12) United States Patent (10) Patent No.: US 12,682,484 B2
Guo et al. (45) Date of Patent: Jul. 14, 2026

(54) TARGET TRACKING METHOD AND APPARATUS, DEVICE, AND MEDIUM

(71) Applicant: Beijing Zitiao Network Technology Co., Ltd., Beijing (CN)

(72) Inventors: Hengkai Guo, Beijing (CN); Sicong Du, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 349 days.

(21) Appl. No.: 18/468,647

(22) Filed: Sep. 15, 2023

(65) Prior Publication Data

US 2024/0005552 A1 Jan. 4, 2024

Related U.S. Application Data

(63) Continuation-in-part of application No. PCT/CN2022/080985, filed on Mar. 15, 2022, and a
(Continued)

(30) Foreign Application Priority Data

| Mar. 15, 2021 | (CN) | .......................... 202110276358.7 |
| Mar. 15, 2021 | (CN) | .......................... 202110276360.4 |
| Mar. 15, 2021 | (CN) | .......................... 202110277835.1 |

(51) Int. Cl.
*G06T 7/73* (2017.01)
*G06T 7/20* (2017.01)

(52) U.S. Cl.
CPC .................. *G06T 7/73* (2017.01); *G06T 7/20* (2013.01); *G06T 2207/10016* (2013.01)

(58) Field of Classification Search
CPC ... G06T 7/73; G06T 7/20; G06T 2207/10016; G06T 7/246
See application file for complete search history.

(56) References Cited

U.S. PATENT DOCUMENTS

| 11,232,594 B1 * | 1/2022 | Rana .................. G02B 27/0172 |
| 2003/0182076 A1 * | 9/2003 | Udomkesmalee ...... G01S 17/08 |
| | | 702/150 |

(Continued)

FOREIGN PATENT DOCUMENTS

| CN | 104240289 A | 12/2014 |
| CN | 106713747 A | 5/2017 |

(Continued)

OTHER PUBLICATIONS

China National Intellectual Property Administration, Rejection Decision for Chinese Application No. 202110276358.7, mailed Oct. 25, 2024, 12 pages.
(Continued)

*Primary Examiner* — Amara Abdi
(74) *Attorney, Agent, or Firm* — Alleman Hall LLP

(57) ABSTRACT

The present disclosure relates to a target tracking method and apparatus, a device, and a medium. The method includes: acquiring a target video frame; determining, based on the target video frame, position information of a target area in the target video frame; in a case that a determination of the position information of the target area in the target video frame is failed, determining target photographing position information, and determining again, according to the target photographing position information and a camera projection algorithm, the position information of the target area in the target video frame.

18 Claims, 7 Drawing Sheets

Acquiring a target video frame — 101

Determining, based on the target video frame, position information of a target area in the target video frame — 102

In a case that a determination of the position information of the target area in the target video frame is failed, determining target photographing position information — 103

Determining again, according to the target photographing position information and a camera projection algorithm, the position information of the target area in the target video frame — 104

Related U.S. Application Data continuation-in-part of application No. PCT/CN2022/080977, filed on Mar. 15, 2022, and a continuation-in-part of application No. PCT/CN2022/080916, filed on Mar. 15, 2022.

(56)     References Cited

U.S. PATENT DOCUMENTS

| | | | |
|---|---|---|---|
| 2007/0140531 A1* | 6/2007 | Hamza | G06V 40/193 |
| | | | 382/117 |
| 2013/0307934 A1* | 11/2013 | Densham | G03B 31/00 |
| | | | 348/46 |
| 2015/0199817 A1 | 7/2015 | Ishimaru et al. | |
| 2017/0140526 A1* | 5/2017 | Chen | G06Q 30/018 |
| 2017/0178355 A1 | 6/2017 | Alibay et al. | |
| 2020/0184654 A1* | 6/2020 | Kim | G06V 20/58 |
| 2020/0302615 A1 | 9/2020 | Lin et al. | |
| 2021/0118150 A1* | 4/2021 | Jia | G06T 7/246 |
| 2021/0120221 A1* | 4/2021 | Li | G06T 7/579 |

FOREIGN PATENT DOCUMENTS

| | | |
|---|---|---|
| CN | 107103323 A | 8/2017 |
| CN | 107404615 A | 11/2017 |
| CN | 107590453 A | 1/2018 |
| CN | 107610108 A | 1/2018 |
| CN | 107993256 A | 5/2018 |
| CN | 105761277 B | 9/2018 |
| CN | 108492315 A | 9/2018 |
| CN | 108519088 A | 9/2018 |
| CN | 108848304 A | 11/2018 |
| CN | 109190612 A | 1/2019 |
| CN | 109211241 A | 1/2019 |
| CN | 109579701 A | 4/2019 |
| CN | 109598744 A | 4/2019 |
| CN | 109685855 A | 4/2019 |
| CN | 109887003 A | 6/2019 |
| CN | 109919971 A | 6/2019 |
| CN | 110119649 A | 8/2019 |
| CN | 110335292 A | 10/2019 |
| CN | 110807807 A | 2/2020 |
| CN | 111311681 A | 6/2020 |
| CN | 111429477 A | 7/2020 |
| CN | 108737694 B | 8/2020 |
| CN | 111612827 A | 9/2020 |
| CN | 111709973 A | 9/2020 |
| CN | 112258556 A | 1/2021 |
| CN | 105160686 | * 12/2025 ... G06T 2207/10032 |
| JP | H08201021 A | 8/1996 |
| JP | 2007164517 A | 6/2007 |
| JP | 2007256091 A | 10/2007 |
| JP | 2010233921 A | 10/2010 |
| JP | 2011134065 A | 7/2011 |
| KR | 20040039080 A | 5/2004 |

OTHER PUBLICATIONS

China National Intellectual Property Administration, Third Office Action for Chinese Application No. 202110276360.4, mailed Nov. 6, 2024, 9 pages.

China National Intellectual Property Administration, Office Action Issued in Application No. 202110276358.7, May 30, 2024, 16 pages.

China National Intellectual Property Administration, Office Action Issued in Application No. 202110276360.4, May 30, 2024, 13 pages.

Deng, Y. et al., "Scene model based object tracking method across multiple cameras," Computer Engineering and Applications, vol. 44, No. 5, 2008, 4 pages.

China National Intellectual Property Administration, Office Action and Search Report Issued in Application No. 202110277835.1, Jan. 5, 2023, 10 pages (submitted with partial English translation).

China National Intellectual Property Administration, Office Action and Search Report Issued in Application No. 202110277835.1, Jul. 20, 2023, 9 pages (submitted with partial English translation).

ISA China National Intellectual Property Administration, International Search Report and Written Opinion Issued in Application No. PCT/CN2022/080977, Apr. 26, 2022, WIPO, 11 pages.

ISA China National Intellectual Property Administration, International Search Report and Written Opinion Issued in Application No. PCT/CN2022/080985, May 12, 2022, WIPO, 11 pages.

ISA China National Intellectual Property Administration, International Search Report and Written Opinion Issued in Application No. PCT/CN2022/080916, Apr. 29, 2022, WIPO, 12 pages.

* cited by examiner

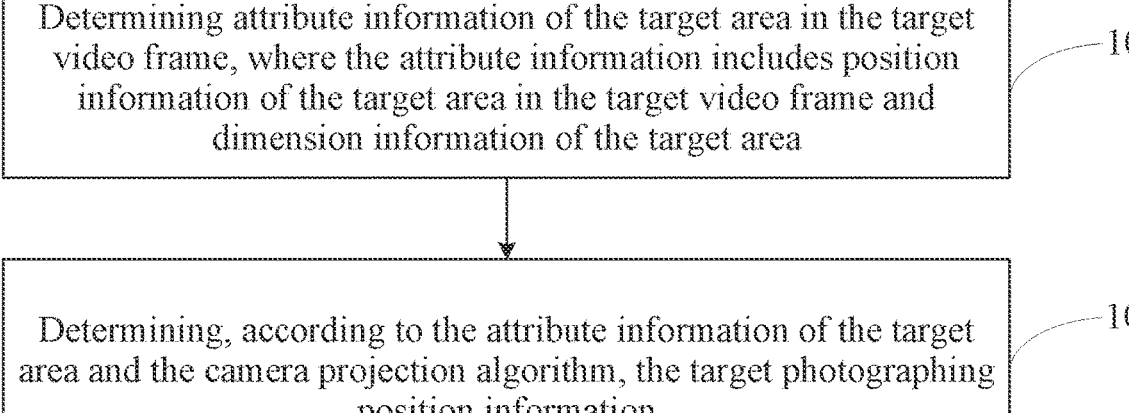

Determining attribute information of the target area in the target video frame, where the attribute information includes position information of the target area in the target video frame and dimension information of the target area — 1031

Determining, according to the attribute information of the target area and the camera projection algorithm, the target photographing position information — 1032

FIG. 1C

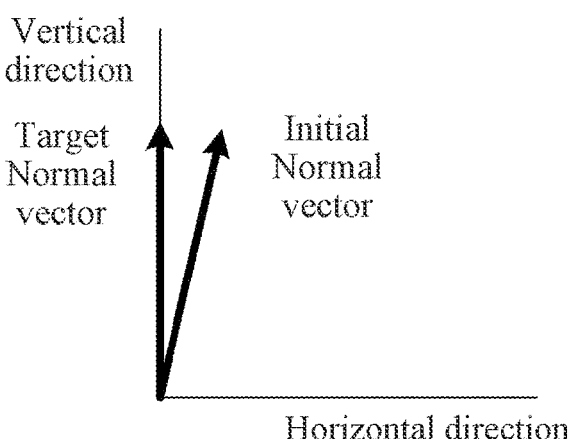

Vertical direction

Target Normal vector

Initial Normal vector

Horizontal direction

FIG. 2

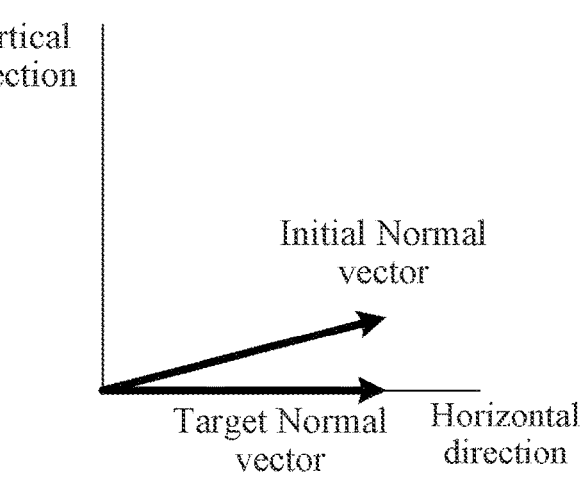

FIG. 3

Acquiring a target video frame — 201A

Determining, based on the target video frame, position information of a target area in the target video frame — 202A In a case that a determination of the position information of the target area in the target video frame is failed, determining, through a simultaneous localization and mapping algorithm, initial photographing position information in a first coordinate system — 203A Determining a target transformation relationship of the first coordinate system and a second coordinate system corresponding to a camera projection algorithm — 204A Determining, according to the initial photographing position information and the target transformation relationship, the target photographing position information — 205A Determining again, according to the target photographing position information and the camera projection algorithm, the position information of the target area in the target video frame — 206A

FIG. 4A

TARGET TRACKING METHOD AND APPARATUS, DEVICE, AND MEDIUM

CROSS-REFERENCE TO RELATED APPLICATION

The present application is a continuation-in-part of International Application No. PCT/CN2022/080985, filed on Mar. 15, 2022 which claims priority to Chinese patent application No. 202110276360.4, filed on Mar. 15, 2021 to the China National Intellectual Property Administration, entitled "TARGET TRACKING METHOD AND APPARATUS, DEVICE, AND MEDIUM", International Application No. PCT/CN2022/080977, filed on Mar. 15, 2022 which claims priority to Chinese patent application No. 202110276358.7, filed on Mar. 15, 2021 to the China National Intellectual Property Administration, entitled "TARGET TRACKING METHOD AND APPARATUS, DEVICE, AND MEDIUM", and International Application No. PCT/CN2022/080916, filed on Mar. 15, 2022 which claims priority to Chinese patent application No. 202110277835.1, filed on Mar. 15, 2021 to the China National Intellectual Property Administration, entitled "METHOD AND APPARATUS FOR DETERMINING PHOTOGRAPHING POSITION, DEVICE, AND MEDIUM", all the aforementioned patent applications are incorporated into the present application by reference in their entireties.

TECHNICAL FIELD

The present disclosure relates to the field of video processing technology, and in particular, to a target tracking method and apparatus, a device, and a medium.

BACKGROUND

With the continuous development of intelligent terminal technology, the demand for recognition and tracking of the video content is increasing day by day.

At present, target tracking for respective video frames in a video may be performed based on edge features, but the above manner may result in a failure of the tracking due to that the target can not be detected when a camera moves fast, and has poor robustness. In addition, there are shortcomings of low accuracy and inability to meet requirements in the recognition and tracking of the video content.

SUMMARY

In order to solve the above technical problems or at least partially solve the above technical problems, the present disclosure provides a target tracking method and apparatus, an electronic device, a storage medium, a computer program product and a computer program.

An embodiment of the present disclosure provides a target tracking method, the method includes:

acquiring a target video frame;

determining, based on the target video frame, position information of a target area in the target video frame;

in a case that a determination of the position information of the target area in the target video frame is failed, determining target photographing position information, and determining again, according to the target photographing position information and a camera projection algorithm, the position information of the target area in the target video frame.

An embodiment of the present disclosure further provides a target tracking apparatus, the apparatus includes:

a video frame module, configured to acquire a target video frame;

a first position module, configured to determine, based on the target video frame, position information of a target area in the target video frame;

a photographing position module, configured to determine, in a case that a determination of the position information of the target area in the target video frame is failed, target photographing position information; and a second position module, configured to determine again, according to the target photographing position information and a camera projection algorithm, the position information of the target area in the target video frame.

An embodiment of the present disclosure further provides an electronic device, the electronic device includes: a processor; and a memory configured to store instructions executable by the processor; where the processor is configured to read the instructions and execute the instructions to implement the target tracking method as provided by embodiments of the present disclosure.

An embodiment of the present disclosure further provides a computer readable storage medium, the storage medium stores a computer program, the computer program is configured to enable a processor to execute the target tracking method as provided by embodiments of the present disclosure.

An embodiment of the present disclosure further provides a computer program product, including a computer program, the computer program is configured to enable a processor to execute the target tracking method as provided by embodiments of the present disclosure.

An embodiment of the present disclosure further provides a computer program, the computer program is configured to enable a processor to execute the target tracking method as provided by embodiments of the present disclosure.

Compared to the prior art, the technical solution provided by the embodiments of the present disclosure has following advantages: according to the target tracking method provided by the embodiments of the present disclosure, a target video frame is acquired; position information of a target area in the target video frame is determined based on the target video frame; in a case that a determination of the position information of the target area in the target video frame is failed, target photographing position information is determined, and the position information of the target area in the target video frame is determined again according to the target photographing position information and a camera projection algorithm. By using the above technical solution, after the tracking of the target area in the target video frame is failed, a position of the target area in the target video frame can be re-determined according to the photographing position determined based on a simultaneous localization and mapping algorithm, then recovery of tracking is achieved, the target tracking can also be achieved even when the camera moves fast, and robustness of tracking is improved.

BRIEF DESCRIPTION OF DRAWINGS

The above and other characteristics, advantages, and aspects of respective embodiments of the present disclosure will become more apparent by combining the drawings and referring to the following specific implementation. Throughout the drawings, the same or similar reference signs represent the same or similar elements. It should be understood that the drawings are illustrative, and the components and elements may not necessarily be drawn to scale.

FIG. 1C is a schematic flowchart of a method for determining target photographing position information provided by an embodiment of the present disclosure.

FIG. 2 is a schematic diagram of a projection of a normal vector provided by an embodiment of the present disclosure.

FIG. 3 is a schematic diagram of another projection of a normal vector provided by an embodiment of the present disclosure.

FIG. 4A is a schematic flowchart of another target tracking method provided by an embodiment of the present disclosure.

DESCRIPTION OF EMBODIMENTS

Figures 1A, 1B:
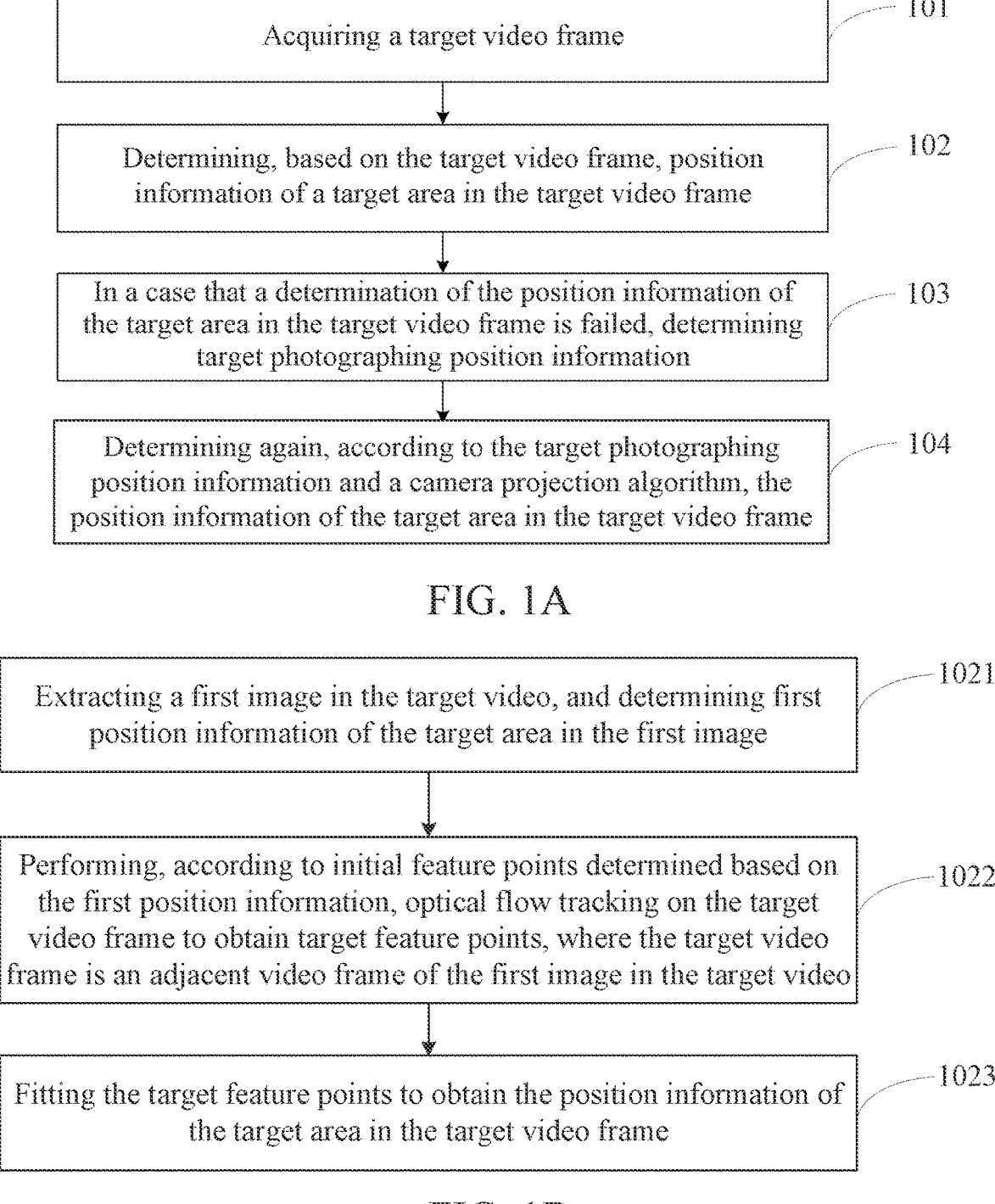
FIG. 1A is a schematic flowchart of a target tracking method provided by an embodiment of the present disclosure.
FIG. 1B is a schematic flowchart of a method for determining position information of a target area in the target video frame.

Embodiments of the present disclosure will be described in more detail below with reference to the drawings. Although certain embodiments of the present disclosure are shown in the drawings, it should be understood that the present disclosure can be implemented in various forms and should not be construed as limited to the embodiments described here. On the contrary, these embodiments are provided for a more thorough and complete understanding of the present disclosure. It should be understood that the drawings and embodiments of the present disclosure are only for illustrative purposes and are not intended to limit the protection scope of the present disclosure.

It should be understood that the various steps recorded in the method implementations of the present disclosure can be executed in different orders and/or in parallel. In addition, the method implementations may include extra steps and/or may omit the steps shown for execution. The scope of the present disclosure is not limited in this regard.

The term "include" and its variations used herein are open-ended, meaning "include but not limited to". The term "based on" refers to "at least partially based on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts such as "first" and "second" mentioned in the present disclosure are only used to distinguish different apparatuses, modules or units, and are not intended to limit the order or interdependence of the functions performed by these apparatuses, modules or units.

It should be noted that the modifiers of "one" and "multiple" mentioned in the present disclosure are indicative rather than restrictive, and those skilled in the art should understand that unless otherwise explicitly stated in the context, they should be understood them as "one or more".

The names of messages or information exchanged between multiple apparatuses in the embodiments of the present disclosure are for illustrative purposes only and are not intended to limit the scope of these messages or information.

FIG. 1A is a schematic flowchart of a target tracking method provided by an embodiment of the present disclosure, the method can be executed by a target tracking apparatus, where the apparatus may be implemented by using software and/or hardware, and can generally be integrated into an electronic device. It can be a device with a function of image acquisition, a single photographing apparatus, or a photographing module on a terminal device, for example, it can be a photographing module on a phone. As shown in FIG. 1A, the method includes the following steps.

Step 101, acquiring a target video frame.

A video frame, also known as an image frame, may be the smallest unit that makes up a video, or a single image. The target video frame may be any image frame that needs to be detected and tracked, a video frame in a video captured by a device with a function of video capture or in a video obtained from the Internet, or an image captured in real time, which is not limited in the present disclosure.

Step 102, determining, based on the target video frame, position information of a target area in the target video frame.

The target area refers to an area with a preset shape, specifically refers to an area in the target video frame where a target shape object is located. The target shape is not limited and may refer to a shape which can be represented by an equation, for example, the target shape may include an ellipse, a circle, or a rectangle etc. In the embodiments of the present disclosure, an example is taken where the target area is an elliptical area in the target video frame for illustration. The position information of the target area may be information representing a position of the target area in the target video frame, which may specifically include a vertex coordinate, a center point coordinate, or other information of the target area in the target video frame.

In a possible implementation, after the target video frame is acquired, it is possible to perform feature detection on the target video frame to obtain the position information of the target area in the target video frame, for example, by using a preset detection algorithm. The above preset detection algorithm may be a detection algorithm based on deep learning or a contour detection algorithm, etc., which may be specifically determined according to actual situations. For example, in a case that the target area is an elliptical area, the preset detection algorithm may be any ellipse detection algorithm, a process of determining the position information of the target area in the target video frame may include: performing, by using the ellipse detection algorithm, contour detection on the target video frame, then fitting an elliptical contour obtained from the contour detection to obtain the position information of the elliptical area in the target video frame.

In a possible implementation, referring to FIG. 1B, when the target video frame is a video frame in the target video, the determining, based on the target video frame, the position information of the target area in the target video frame may further include:

Step 1021, extracting a first image in the target video, and determining first position information of the target area in the first image, where the target video frame is an adjacent video frame of the first image in the target video;

Step 1022, performing, according to initial feature points determined based on the first position information, optical flow tracking on the target video frame to obtain target feature points; and Step 1023, fitting the target feature points to obtain the position information of the target area in the target video frame.

The target video may be any video that needs to be detected and tracked, a video captured by a device with a function of video capture, or a video obtained from the Internet or other devices, without any restrictions. A video frame, also known as an image frame, may be the smallest unit that makes up a video. The target video frame may be any image frame in the target video, the first image may be a previous image adjacent to the target video frame in a chronological order in the target video. In the embodiment of the present disclosure, after the target video is acquired, the first image can be extracted from the target video, and a detection of the target area can be performed on the first image by using the above preset detection algorithm to determine the first position information of the target area in the first image. For example, in a case that the target area is an elliptical area, the preset detection algorithm may be any ellipse detection algorithm, the ellipse detection algorithm is used to perform a contour detection on the first image, then an elliptical contour obtained by the contour detection is fitted to obtain the first position information of the target area in the first image, here the first position information is position information of the target area in the first image. Before performing, according to the initial feature points determined based on the first position information, the optical flow tracking on the target video frame to obtain the target feature points, the method further includes: sampling, according to the first position information, an edge contour of the target area in the first image to determine the initial feature points. In a possible implementation, sampling, according to the first position information, the edge contour of the target area in the first image to determine the initial feature points includes: in a case that the target area is an elliptical area, representing, according to the first position information, the target area in a polar coordinate to obtain an elliptical contour, for example, a vertex coordinate and/or a center point coordinate; and sampling, according to a preset polar angle interval, in the elliptical contour to obtain the initial feature points.

The preset polar angle interval may be set according to actual situations, for example, the preset polar angle interval may be set as 5 degrees. In the embodiment of the present disclosure, the target area in the first image can be sampled based on the first position information determined above, to further determine the initial feature points. Taking that the target area is the elliptical area as an example, an elliptical equation of the elliptical area of the first image is represented, according to the first position information, in the polar coordinate to obtain an elliptical contour; and sampling is performed on the elliptical contour according to the preset polar angle interval, one feature point is collected per preset polar angle interval to obtain multiple initial feature points. After that, in the target video frame, the initial feature points obtained from the above sampling are tracked by using an optical flow tracking algorithm, the feature points that are successfully tracked are retained as the target feature points and the feature points that are failed to be tracked are removed. The target feature points are fitted to obtain the position information of the target area in the target video frame.

In some embodiments, fitting the target feature points to obtain the position information of the target area in the target video frame includes: in a case that a coverage range of the target feature points on an edge contour of the target area is greater than or equal to a preset range, fitting the target feature points to obtain the position information of the target area in the target video frame. The preset range refers to a predetermined range that meets a shape of the target area, which can be set according to actual situations. For example, the preset range can be ¾ of an entire range of the edge contour. Specifically, after the target feature points are determined, it can be determined whether the coverage range of the target feature points on the edge contour of the target area is greater than or equal to the preset range, if so, a fitting algorithm is used to fit the target feature points to obtain the position information of the target area in the target video frame. Illustratively, when the target area is the elliptical area, if a range of the target feature points on the elliptical contour is greater than or equal to ¾ of the elliptical contour, then a Random Sample Consensus (RANSAC) algorithm is used to perform ellipse fitting, that is randomly extracting 5 feature points from the target feature points each time, determining the number of interior point sets among these 5 points, until a largest interior point set is found, and using 5 points corresponding to the largest interior point set to perform the ellipse fitting, where the above interior point set refers to a set of points on the elliptical contour. If the determination result is no, that is, in a case that the coverage range of the target feature points on the edge contour of the target area is smaller than the preset range, it is determined that the tracking is failed, then the preset detection algorithm may be used directly to perform detection on the target video frame, to determine the position information of the target area in the target video frame. The above preset detection algorithm may be implemented by detecting the target video frame, may be a detection algorithm based on deep learning or a contour detection algorithm, etc., without any restrictions.

It can be understood that, after the position information of the target area in the target video frame is determined, the target video frame can be determined as a new first image, and another video frame adjacent to the target video frame is determined as a new target video frame, returning to executing step 1022 until a determination of a position of a target area for each video frame in the video is completed.

By using the above technical solution, based on the detection of the target area of one video frame of the video, more accurate determination of the positions of the target area in other video frames can be implemented by tracking and fitting the feature points, thus avoiding the detection on every video frame, improving the computation efficiency of tracking, and achieving fast and accurate target recognition and tracking for each image frame in the video.

In some embodiments, after determining the first position information of the target area in the first image, the method further includes: determining a change parameter of the target video frame relative to the first image; the performing, according to the initial feature points determined based on the first position information, the optical flow tracking on the target video frame to obtain the target feature points includes: if it is determined, based on the change parameter, that the target video frame does not meet a reusing condition, performing, according to the initial feature points determined based on the first position information, the optical flow tracking on the target video frame to obtain the target feature points. The reusing condition refers to a specific condition for determining whether the first position information of the target area in the first image can be reused as the position information of the target area target video frame. In a possible implementation, the reusing condition is that the change parameter is smaller than or equal to a change threshold. The change threshold refers to a predetermined threshold, and can be set according to actual situations. For example, when by making movement information of a feature point in the target video frame relative to a corresponding feature point in the first image to represent the change parameter, the change threshold may be a distance threshold, which is set as 0.8.

The change parameter refers to a parameter that represents the change of the target video frame relative to the first image. In a possible implementation, determining the change parameter of the target video frame relative to the first image may include: extracting a first feature point in the first image; performing, according to the first feature point, the optical flow tracking on the target video frame to determine a second feature point, and determining a movement distance between the first feature point and the second feature point as the change parameter. The first feature point may be a corner point that is obtained by detecting the first image using a features from accelerated segment test (FAST) corner point detection algorithm, where the corner point refers to an extreme point, i.e. a point with a particularly prominent attribute in a certain aspect. An object to be detected may be the entire first image, or simply the above target area, without any restrictions.

Specifically, for the first image, the FAST corner point detection algorithm may be used to extract the first feature point, the first feature point is taken as an input for a KLT (Kanade Lucas Tomasi) optical flow tracking algorithm to obtain the output second feature point that is successfully tracked. After that, since the number of first feature points and the number of second feature points may be large, an average value of the distances between the first feature points and the second feature points may be calculated, and the average value of the distances is determined as the change parameter.

In the embodiment of the present disclosure, the target tracking method may further include: if it is determined, based on the change parameter, that the target video frame meets the reusing condition, determining the first position information as the position information of the target area in the target video frame. If it is determined that the change parameter is smaller than or equal to the change threshold, it indicates that the current camera is basically in a stationary state, the positions of the target area in two adjacent video frames are similar, the target video frame meets the reusing condition, the first position information can be assigned to the target video frame, i.e. the position information of the target area in the first image and the target video frame is the same.

Specifically, after the change parameter of the target video frame relative to the first image is determined, the change parameter can be compared with the change threshold. If it is determined that the change parameter is greater than the change threshold, it can be determined that the target video frame does not meet the reusing condition and it needs to perform re-tracking, i.e. performing, according to the initial feature points determined based on the first position information, the optical flow tracking on the target video frame to obtain the target feature points; or else, it is determined that the target video frame meets the reusing condition, the first position information is determined as the position information of the target area in the target video frame.

In the above solution, based on the detection of the target area of one image frame of the video, more accurate determination of the position of the target area in the target video frame can be implemented by tracking and fitting the feature points, thus improving the computation efficiency of the determination of the position of the target area in the target video frame. In addition, by introducing the reusing condition as a judgment for two adjacent video frames, when the change between the two adjacent video frames is large, the above tracking and fitting of the feature points are used to determine the position of the target area; when the change or difference between the two adjacent video frames is small, it indicates that the similarity between the two adjacent video frames is high, at this time a next video frame can directly reuse the position information of the target area of a previous video frame, there is no need for re-detection, the workload is saved and the computational efficiency is improved.

Step 103, in a case that a determination of the position information of the target area in the target video frame is failed, determining target photographing position information.

In the embodiment of the present disclosure, when the camera moves fast, it may not be possible to successfully determine the position information of the target area in the target video frame, and then it is possible to determine the target photographing position information. The target photographing position information refers to a coordinate of a photographing position in the world coordinate system.

In the embodiment of the present disclosure, determining the target photographing position information may include: determining, through a simultaneous localization and mapping algorithm, initial photographing position information in a first coordinate system; determining a target transformation relationship of the first coordinate system and a second coordinate system corresponding to a camera projection algorithm; and determining, according to the initial photographing position information and the target transformation relationship, the target photographing position information.

The simultaneous localization and mapping (SLAM) algorithm is mainly used to solve a problem of positioning, navigation, and map construction when devices equipped with specific sensors operate in unknown environments. If the sensor is a camera, the position of the camera, also known as the photographing position, can be determined. In the embodiment of the present disclosure, through the SLAM algorithm, the initial photographing position information of the photographing position in the first coordinate system is determined. The camera projection algorithm may be an algorithm of a pinhole projection model of a camera.

In a possible implementation, determining the target transformation relationship of the first coordinate system and the second coordinate system corresponding to the camera projection algorithm may include: determining, through the simultaneous localization and mapping algorithm and the camera projection algorithm, first photographing position information and second photographing position information of a detected video frame respectively, where the detected video frame is a video frame whose target area is successfully tracked; and determining, according to the first photographing position information and the second photographing position information of the detected video frame, the target transformation relationship.

The detected video frame refers to a video frame that is successfully tracked, that is, a video frame for which a position of the target area is successfully determined. The number of the detected video frames is one or multiple. When the number of the detected video frames is multiple, the target transformation relationship is an average value of the transformation relationships corresponding to respective detected video frames. The target transformation relationship includes a transformation scale and a transformation translation. The target transformation relationship refers to a transformation relationship between the first coordinate system corresponding to the simultaneous localization and mapping algorithm and the second coordinate system corresponding to the camera projection algorithm. The target transformation relationship may include transformations in terms of rotation, scaling, and translation between two coordinate systems. Since the rotations of the two coordinate systems are the same, there is no need for transformations in terms of rotation, which means the target transformation relationship includes a transformation scale and a transformation translation. Since when the number of the detected video frames is multiple, one transformation relationship can be calculated for each detected video frame, the target transformation relationship can be the average value of the transformation relationships corresponding to respective detected video frames.

Specifically, for the detected video frame, the first photographing position information can be determined through the simultaneous localization and mapping algorithm, and the second photographing position information can be determined through the camera projection algorithm. The first photographing position information and the second photographing position information are position information of the photographing position in the above first coordinate system and second coordinate system. After that, the least squares method can be used to determine the target transformation relationship of the above first coordinate system and second coordinate system according to the above first photographing position information and second photographing position information. Illustratively, the first photographing position information may be represented by slam_w_T_c, the second photographing position information may be represented by ellipse_w_T_c, the target transformation relationship is represented as slam_w_T_c=ellipse_w_T_c*align_scale+align_translation, where align_scale represents the transformation scale of the two coordinate systems, align_translation represents the transformation translation of the two coordinate systems.

It can be understood that the above first coordinate system may be a first world coordinate system corresponding to the simultaneous localization and mapping algorithm, the above second coordinate system may be a second world coordinate system corresponding to the camera projection algorithm or a spatial coordinate system with a target shape object as the origin. The origins and coordinate axes of the above first world coordinate system and second world coordinate system are different and also need a transformation.

In a possible implementation, determining, according to the initial photographing position information and the target transformation relationship, the target photographing position information includes: transforming, based on the target transformation relationship, the initial photographing position information from information of the first coordinate system to information of the second coordinate system to obtain the target photographing position information. After the above target transformation relationship is determined, the initial photographing position information can be transformed, through the target transformation relationship, from the information of the first coordinate system corresponding to the simultaneous localization and mapping algorithm to the information of the second coordinate system corresponding to the camera projection algorithm. After that, the step of subsequently determining the position information of the target area in the target video frame can be carried out based on the target photographing position information subject to coordinate system transformation.

Step 104, determining again, according to the target photographing position information and a camera projection algorithm, the position information of the target area in the target video frame.

In the embodiment of the present disclosure, determining again, according to the target photographing position information and the camera projection algorithm, the position information of the target area in the target video frame may include: performing, according to the target photographing position information and position information of a target shape object corresponding to the target area, position solving to determine translation information from a photographing position to the target shape object, where the photographing position is a position where an apparatus for photographing the target video frame is located; inputting the translation information from the photographing position to the target shape object into a projection equation of the camera projection algorithm to determine the position information of the target area in the target video frame.

The position information of the above target shape object may be a predetermined fixed value, which is a known quantity. For example, the origin of the world coordinate system can be set at a position where the target shape object is located, and the coordinate of this position information is (0, 0, 0). The translation from the target photographing position to the target shape object can be determined according to the position of the target shape object, the target photographing position and a transformation equation. The above transformation equation may be represented as $W10=W20+W12$, where W10 represents the photographing position information in the world coordinate system (i.e. a vector in the world coordinate system from the photographing position to the origin of the world coordinate system), W20 represents the position information of the target shape object in the world coordinate system (i.e. a vector in the world coordinate system from the position of the target shape object to the origin of the world coordinate system), W12 represents the translation information from the target photographing position to the target area in the world coordinate system (i.e. a vector from the photographing position to the target shape object in the world coordinate system). The above W10, W20, and W12 are all vectors in the world coordinate system, with directions and magnitudes. The triangle rule is used for addition of the two vectors W20 and W12, the two vectors are connected in sequence from beginning to end, the result W10 directs from a beginning point of a first vector towards an end point of a last vector. In this step, the above target photographing position information W10 after the coordinate is transformed and the position information W20 of the target shape object can be input into the transformation equation, to obtain the translation information W12 from the target photographing position to the target shape object.

The position information of the target area in the projection equation is related to an internal parameter of the photographing apparatus, a rotation matrix from the coordinate system where the photographing position is located to the world coordinate system, and the position information of the origin of the world coordinate system in the coordinate system where the photographing position is located. The projection equation may be represented as $p=\pi[K(R12*W20+T)]$, where 7L represents a factor which may be a factor determined based on the dimension information of the target area, K represents the internal parameter of the photographing apparatus which may specifically include a focal length of the photographing position, a distortion parameter, and other internal parameters of the photographing apparatus, R12 represents the rotation matrix from the coordinate system where the photographing position is located to the world coordinate system, p represents the position information of the target area, and T represents the position information of the origin of the world coordinate system in the coordinate system where the photographing position is located. The translation information W12 from the photographing position to the target shape object in the world coordinate system is related to the position information T of the origin of the world coordinate system in the coordinate system where the photographing position is located. $K^{-1}*ratio*p=R12*W20+T$ is obtained by a transformation of the above projection equation $p=\pi[K(R12*W20+T)]$, where $ratio=1/\pi$; the transformation is continued to obtain $R21*K^{-1}*ratio*p=W20+W01=W21$, where $R12=1/R21$, $T=W01/R21$, W21 represents a vector from the target shape object to the photographing position in the world coordinate system. From this, it can be known $W12=-1*ratio*R21*K^{-1}*p$, where W01 represents a vector from the origin of the world coordinate system to the photographing position in the world coordinate system, i.e. a reverse vector of the photographing position information, R21 represents an inverse matrix of the rotation matrix from the coordinate system where the photographing position is located to the world coordinate system, $ratio=1/\pi$, T is a three-dimensional coordinate, a value that is located at the right side of the equal sign in the projection equation is also a three-dimensional coordinate, p is a two-dimensional coordinate, ration may be a value of a last dimension in the three-dimensional coordinate. According to the translation information $W12=-1*ratio*R21*K^{-1}*p$ from the target photographing position to the target shape object in the above world coordinate system, the position information p of the target area in the target video frame can be determined. In a case that the target area is an elliptical area, the value of ratio is inversely proportional to a sum of a major axis and a minor axis of the ellipse, that is, the larger the elliptical area, the smaller the ratio.

After the translation information W12 from the photographing position to the target area in the world coordinate system is determined, through the transformation equation $W10=W20+W12$, the photographing position information W10 in the world coordinate system can be obtained. In a possible implementation, based on the coordinate transformation, the position of the origin of the world coordinate system in the coordinate where the photographing position is located can be determined as $T=-1*R12*W10$, and the photographing position information in a target shape object coordinate system can be determined as $M=W10*R23$, where R23 represents a rotation matrix from the world coordinate system to the target shape object coordinate system, and an origin of the coordinate system where the photographing position is located is the photographing position, an origin of the target shape object coordinate system is a position of the target shape object.

When the above W12 is an unknown quantity, W12 can be calculated by inputting attribute information of the target area (i.e. the position information and dimension information of the target area) to the projection equation of the camera projection algorithm.

In a possible implementation, referring to FIG. 1C, in a case that a determination of the position information of the target area in the target video frame is successful, the target photographing position information can also be determined based on following operations:

Step 1031, determining attribute information of the target area in the target video frame, where the attribute information includes the position information of the target area in the target video frame and dimension information of the target area; where the target area is an area where the target shape object is located in the target video frame;

Step 1032, determining, according to the attribute information of the target area and the camera projection algorithm, the target photographing position information.

Among them, the target photographing position information is position information of the photographing position relative to the world coordinate system, it may be position information of a position where the photographing apparatus for photographing the target video frame (or the target tracking apparatus) is located relative to the world coordinate system. The position information of the above attribute information may be information for representing the position of the target area in the target video frame, which may specifically include a vertex coordinate, a center point coordinate, a size of the target area, and other information of the target area in the target video frame. For the determination of the position information of the above attribute information, reference can be made to the implementations in Steps 1021-1023. The dimension information of the above attribute information refers to size information of the target area. For example, in a case that the target area is an elliptical area, the attribute information may include the center point coordinate of the elliptical area (as the position information) and dimension information of the major and minor axes (as the dimension information), etc.

The target area may be an area where the target shape object is located in the target video frame, that is, an area with a target shape, the target shape is a shape that can be represented by using an equation.

In the embodiment, after the target video frame is acquired, any detection manner can be used to determine the position information and the dimension information of the target area in the target video frame. For example, a preset detection algorithm or a feature point tracking algorithm may be used to determine the position information. In a possible implementation, determining, according to the attribute information of the target area and the camera projection algorithm, the target photographing position information may include: inputting the attribute information of the target area into a projection equation of the camera projection algorithm to determine translation information from the photographing position to the target shape object corresponding to the target area in the world coordinate system; performing, according to the translation information from the photographing position to the target shape object in the world coordinate system and position information of the target shape object in the world coordinate system, position solving to obtain the target photographing position information.

Using the above technical solution, based on a position and a dimension of an area where a fixed shape object is located in a video frame, and the camera projection algorithm, the determination of the photographing position can be implemented. Compared to the solution that requires multiple video frames and only utilizes single dimensional information at present, using information in two dimensions can efficiently locate the photographing position and improve computational efficiency. It can solve the current problem of the deficiencies of low computational efficiency and slow speed when determining the photographing position based on an image.

Next, a specific example will be used to further illustrate the method for determining photographing position provided by the embodiment of the present disclosure. Assuming that the target shape object is an elliptical shape object, the specific process may include the following.

1. Using any ellipse detection algorithm to obtain a center point coordinate and size (major and minor axes) of the elliptical area in the target video frame.

2. Determining the photographing position according to the pinhole projection model (i.e. camera projection algorithm) and the position and the size of the ellipse. The projection equation may be represented as $p=\pi[K(R12*W20+T)]$, where $\pi$ represents a factor determined based on the dimension information of the target area, K represents the internal parameter of the photographing apparatus, R12 represents the rotation matrix from the coordinate system where the photographing position is located to the world coordinate system, p represents the center point coordinate of the elliptical area, and T represents the vector from the origin of the world coordinate system in the coordinate system where the photographing position is located to the origin of the coordinate system where the photographing position is located, the origin of the photographing position coordinate system is the photographing position. $K^{-1}*ratio*p=R12*W20+T$ is obtained based on a transformation of the above projection equation $p=\pi[K(R12*W20+T]$, where $ratio=1/\pi$; the transformation is continued to obtain $R21*K^{-1}*ratio*p=W20+W01=W21$, where $R12=1/R21$, $T=W01/R21$, W21 represents a vector from the target shape object to the photographing position in the world coordinate system. From this, it can be known $W12=-1*ratio*R21*K^{-1}*p$, where W01 represents a vector from the origin of the world coordinate system to the photographing position in the world coordinate system, i.e. a reverse vector of the photographing position information, R21 represents an inverse matrix of the rotation matrix from the coordinate system where the photographing position is located to the world coordinate system, $ratio=1/\pi$, in a case that the target area is an elliptical area, the value of ratio is inversely proportional to a sum of the major axis and the minor axis of the ellipse, that is the larger the elliptical area, the smaller the ratio. After W12 is determined, W12 and W20 can be input into the transformation equation to obtain the photographing position W10 in the world coordinate system. The transformation equation may be represented as $W10=W20+W12$, where W10 represents the photographing position information in the world coordinate system, W20 represents the center point coordinate of the target shape object in the world coordinate system, i.e. the position information of the target shape object, W12 represents the translation information from the photographing position to the target area in the world coordinate system.

In the above description, the position information of the target area in the target video frame is determined (for example, according to Steps 1021-1023 or by performing feature detection on the target video frame), and the target photographing position information is then determined based on such position information of the target area in the target video frame. However, it should be noted that the above Step 1031-1032 can also be applied for determining the target photographing position information, as long as the position information of the target area in the target video frame is known. For example, when the determination of the position information of the target area in the target video frame is failed, preset position information of the target area may be used for determining the target photographing position information according to the above Step 1031-1032.

In addition, since the determined target photographing position information provides position information of the photographing position relative to the world coordinate system, it can also serve to subsequent determination of the position information of the target area in the target video frame.

Solutions in the related art only use single dimensional information and require feature points in multiple video frames for determination, resulting in low computational efficiency. According to the method for determining the photographing position in the embodiment of the present disclosure, since the attribute information of the target area in the image includes information in two dimensions, the photographing position can be determined simply based on a detection of an area where the target shape object is located in one image and the camera projection algorithm, and the target shape can be represented by using an equation which provides more constraints, the determination efficiency is improved.

In the embodiment of the present disclosure, if the target video frame is an image frame in a video and it needs to determine a photographing position for each image in the video, after the photographing position is determined by using the above manners for each image in the video, the Kalman filtering algorithm can be used for performing a smoothing operation to avoid a jump of the photographing position and improve an accuracy of determining the photographing position information.

According to the target tracking solution provided by the embodiment of the present disclosure, a target video frame is acquired; position information of a target area in the target video frame is determined based on the target video frame; in a case that a determination of the position information of the target area in the target video frame is failed, target photographing position information is determined, and the position information of the target area in the target video frame is determined again according to the target photographing position information and a camera projection algorithm. By using the above technical solution, after the tracking of the target area in the target video frame is failed, a position of the target area in the target video frame can be re-determined according to the photographing position determined based on a simultaneous localization and mapping algorithm, then recovery of tracking is achieved, the target tracking can also be achieved even when the camera moves fast, and robustness of tracking is improved.

In some embodiments, the target tracking method may further include: determining an initial normal vector in a plane where the target shape object corresponding to the target area is located, and determining a projection of the initial normal vector on a horizontal plane or a vertical plane as a target normal vector.

The initial normal vector refers to a normal vector in the plane where the target shape object is located in space, the target normal vector refers to the optimized normal vector.

Specifically, after the position information of the target area in the target video frame and an adjacent video frame is determined, the initial normal vector can be determined by decomposing a homography matrix between the two video frames. The above homography matrix is calculated based on points sampled in the target area, and the decomposition method may be a singular value decomposition (SVD) manner. After the initial normal vector is determined, the projection of the initial normal vector on the horizontal plane or the vertical plane can be determined as the target normal vector. Illustratively, the initial normal vector is (0.05, 0.03, 0.994), the target normal vector may be (0, 0, 1).

Illustratively, FIG. 2 is a schematic diagram of a projection of a normal vector provided by an embodiment of the present disclosure, FIG. 3 is a schematic diagram of another projection of a normal vector provided by an embodiment of the present disclosure, FIG. 2 and FIG. 3 respectively represent the target normal vectors after the initial normal vector is projected on the vertical direction and the horizontal direction.

In the above solution, assuming that the object is only located on the horizontal plane or the vertical plane, the optimized target normal vector can be obtained through a projection of the initial normal vector, thus avoiding an error caused by the assumption that the camera is an orthogonal projection model when calculating the normal vector, improving the precision of the normal direction of the plane where the object is located in space, and thereby improving the accuracy of special effects display based on the normal direction.

FIG. 4A is a schematic flowchart of another target tracking method provided by an embodiment of the present disclosure. In this embodiment, the above target tracking method is further optimized based on the above embodiments. As shown in FIG. 4A, the method includes:

Step 201A, acquiring a target video frame;

Step 202A, determining, based on the target video frame, position information of a target area in the target video frame;

Step 203A, in a case that a determination of the position information of the target area in the target video frame is failed, determining, through a simultaneous localization and mapping algorithm, initial photographing position information in a first coordinate system;

Step 204A, determining a target transformation relationship of the first coordinate system and a second coordinate system corresponding to a camera projection algorithm.

In a possible implementation, determining the target transformation relationship of the first coordinate system and the second coordinate system corresponding to the camera projection algorithm includes: determining, through the simultaneous localization and mapping algorithm and the camera projection algorithm, first photographing position information and second photographing position information of a detected video frame respectively, where the detected video frame is a video frame whose target area is successfully tracked; and determining, according to the first photographing position information and the second photographing position information of the detected video frame, the target transformation relationship.

The number of the detected video frames is one or multiple. When the number of the detected video frames is multiple, the target transformation relationship is an average value of the transformation relationships corresponding to respective detected video frames. The target transformation relationship includes a transformation scale and a transformation translation.

Step 205A, determining, according to the initial photographing position information and the target transformation relationship, the target photographing position information.

In a possible implementation, determining, according to the initial photographing position information and the target transformation relationship, the target photographing position information includes: transforming, based on the target transformation relationship, the initial photographing position information from information of the first coordinate system to information of the second coordinate system to obtain the target photographing position information.

Step 206A, determining again, according to the target photographing position information and the camera projection algorithm, the position information of the target area in the target video frame.

In a possible implementation, determining again, according to the target photographing position information and the camera projection algorithm, the position information of the target area in the target video frame includes: performing, according to the target photographing position information and position information of the target shape object corresponding to the target area, position solving to determine translation information from the photographing position to the target shape object, where the target area is an area where the target shape object is located in the target video frame; inputting the translation information from the photographing position to the target shape object into a projection equation of the camera projection algorithm to determine the position information of the target area in the target video frame.

In some embodiments, the target tracking method may further include: determining an initial normal vector in a plane where the target shape object corresponding to the target area is located, and determining a projection of the initial normal vector on a horizontal plane or a vertical plane as a target normal vector.

Figure 4B:
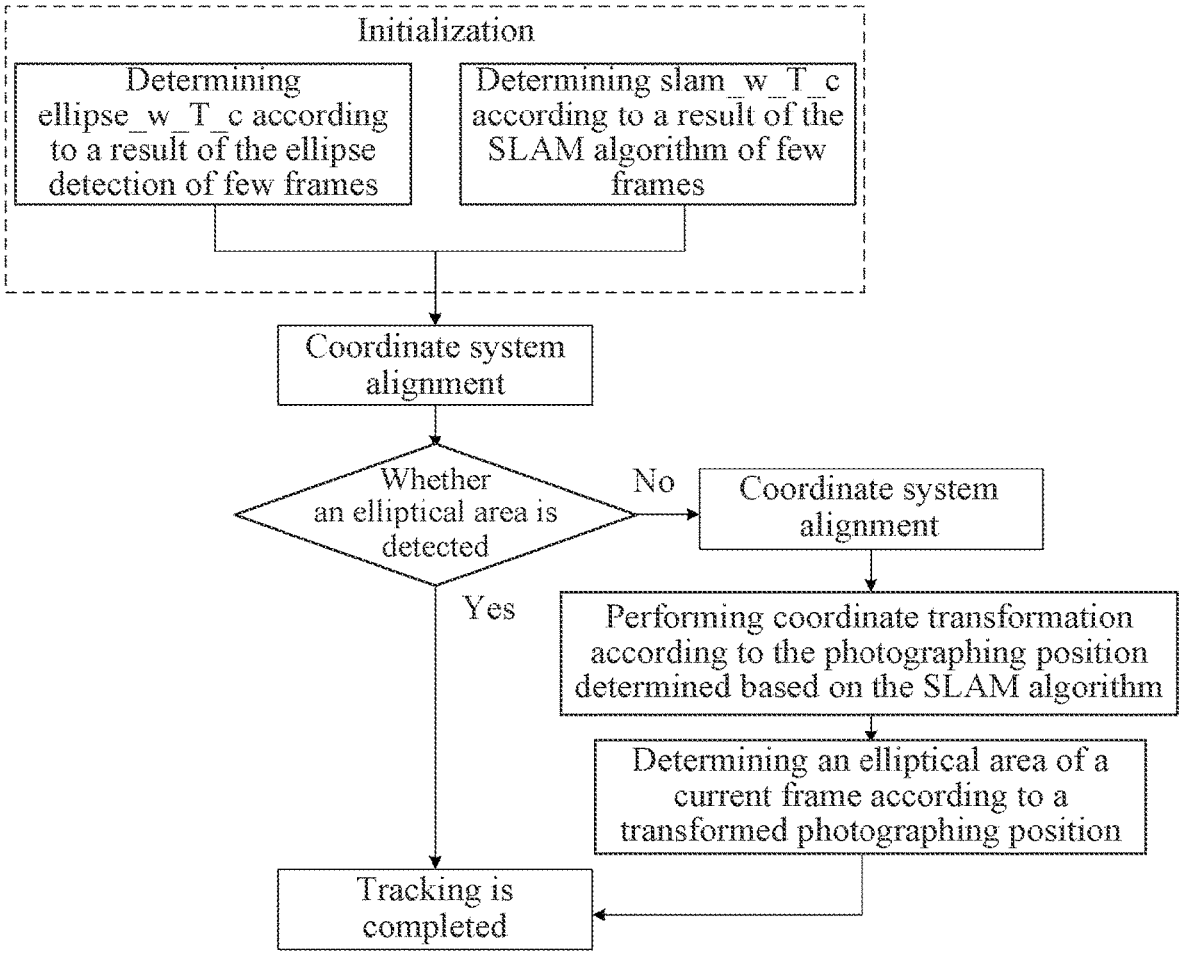
FIG. 4B is a schematic flowchart of another target tracking method provided by an embodiment of the present disclosure.

Next, a specific example will be used to further illustrate the target tracking method in the embodiment of the present disclosure. Illustratively, FIG. 4B is a schematic flowchart of another target tracking method provided by an embodiment of the present disclosure, an example is taken where the target area is an elliptical area and the target shape object is a circular object, the specific process may include the following.

1. Initialization: for first few video frames of the target video, using the SLAM algorithm to complete the calculation of the photographing position in the first coordinate system and representing it by using slam_w_T_c, using the camera projection algorithm to complete the calculation of the photographing position in the second coordinate system according to the known position of the elliptical area and representing it by using ellipse_w_T_c, the above first coordinate system is a first world coordinate system, the above second coordinate system is a second world coordinate system or a circular object coordinate system.

2. Coordinate system alignment: the least squares method is used to calculate the similarity transformation relationship of the known rotation between the first coordinate system and the second coordinate system. When the camera is an image collecting module arranged in an intelligent terminal, the rotation can be obtained through an inertial measurement unit (IMU) of the intelligent terminal, the rotations of the two coordinate systems are the same, so the similarity transformation relationship includes a translation and a scale required by the similarity transformation, thus the coordinate system alignment between the two coordinate systems is completed.

3. Tracking: when the elliptical area cannot be detected in a current frame of the target video because that the image is blurry due to fast movement of the camera, using the photographing position determined by the SLAM algorithm and the target transformation relationship between the two coordinate systems to determine the photographing position in the second coordinate system corresponding to the camera projection algorithm. The photographing position determined by the SLAM algorithm may be represented by using slam_w_T_c, the photographing position corresponding to the camera projection algorithm may be represented by using ellipse_w_T_c, the target transformation relationship is represented as slam_w_T_c=ellipse_w_T_c*align_scale+align_translation, where align_scale represents the transformation scale of the two coordinate systems, align_translation represents the transformation translation of the two coordinate systems. Afterwards, the position of the elliptical area in the current frame is determined according to the photographing position in the second coordinate system, the projection equation and the transformation equation corresponding to the camera projection algorithm.

Furthermore, the inaccurate problem of the photographing position in the second coordinate system determined by the above camera projection algorithm may exist in some cases, resulting in significant errors in the transformation relationship between the first coordinate system and the second coordinate system. Regarding the above problem, two queues can be set up throughout the entire tracking process, the latest set number of slam_w_T_c and ellipse_w_T_c are stored respectively, the set number may be 10. When the elliptical area cannot be detected in the current frame because that the image is blurry due to fast movement of the camera, the transformation relationship of the two coordinate systems are determined based on the few stored slam_w_T_c and ellipse_w_T_c, an average value of the multiple transformation relationships is determined as a final target transformation relationship. Therefore, the photographing position in the second coordinate system corresponding to the camera projection algorithm is determined according to the photographing position determined by the SLAM algorithm and the target transformation relationship, after that, the position of the elliptical area in the current frame is determined according to the photographing position in the second coordinate system.

According to the target tracking solution provided by the embodiment of the present disclosure, a target video frame is acquired; position information of a target area in the target video frame is determined based on the target video frame; in a case that a determination of the position information of the target area in the target video frame is failed, target photographing position information is determined and the position information of the target area in the target video frame is determined again according to the target photographing position information and a camera projection algorithm. By using the above technical solution, after the tracking of the target area in the target video frame is failed, a position of the target area in the target video frame can be re-determined according to the photographing position determined based on a simultaneous localization and mapping algorithm, then recovery of tracking is achieved, the target tracking can also be achieved even when the camera moves fast, and robustness of tracking is improved.

Figure 5A:
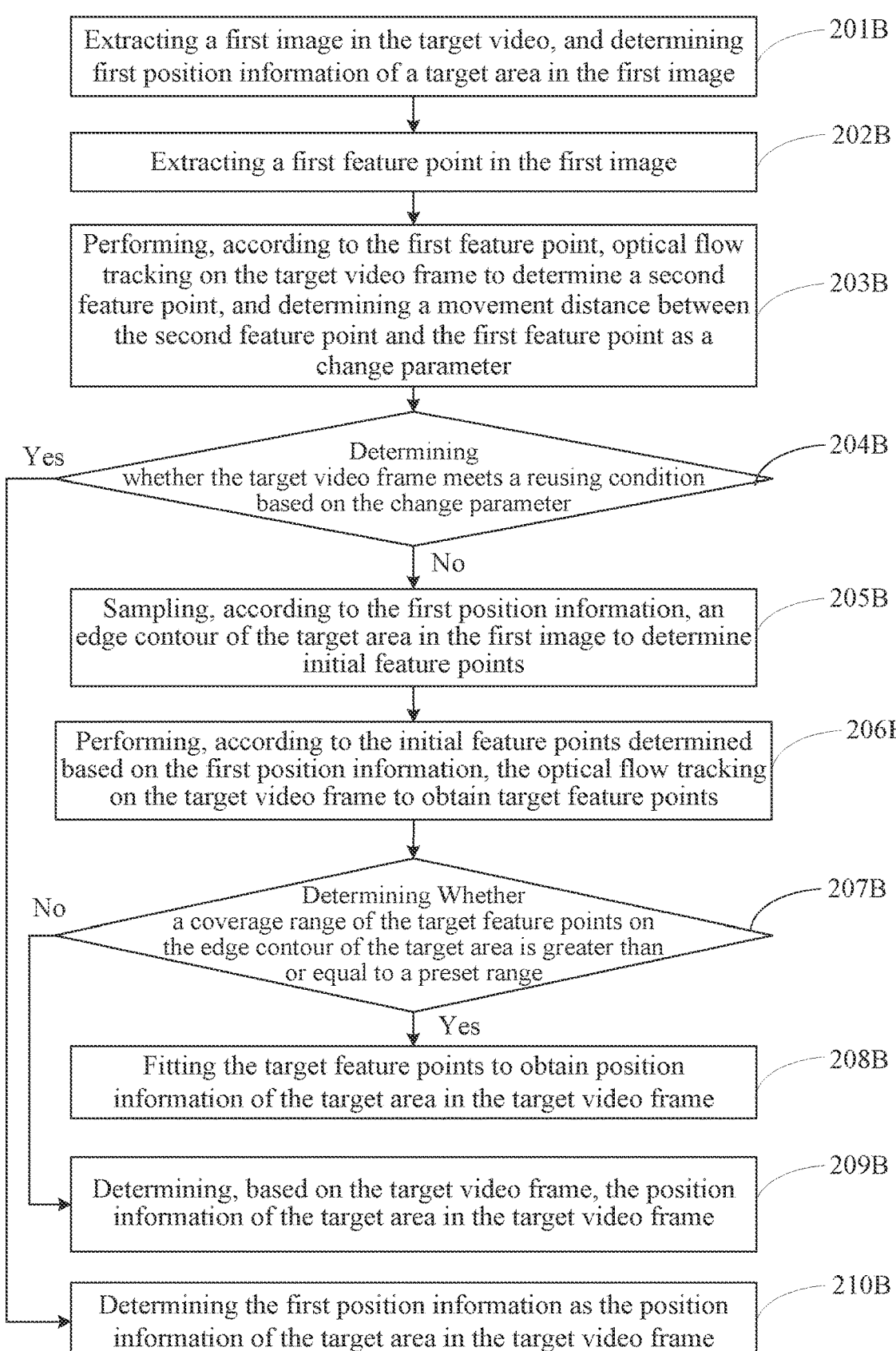
FIG. 5A is a schematic flowchart of another target tracking method provided by an embodiment of the present disclosure.

FIG. 5A is a schematic flowchart of another target tracking method provided by an embodiment of the present disclosure. In this embodiment, the above target tracking method is further optimized based on the above embodiments. As shown in FIG. 5A, the method includes:

Step 201B, extracting a first image in the target video, and determining first position information of a target area in the first image;

Step 202B, extracting a first feature point in the first image;

Step 203B, performing, according to the first feature point, optical flow tracking on the target video frame to determine a second feature point, and determining a movement distance between the second feature point and the first feature point as a change parameter.

The target video frame is an adjacent video frame of the first image in the target video.

Step 204B, determining whether the target video frame meets a reusing condition based on the change parameter, if so, executing Step 210B; or else, executing Step 205B.

The reusing condition is that the change parameter is smaller than or equal to a change threshold. If the change parameter is greater than the change threshold, determining that the target video frame does not meet the reusing condition, and executing Step 205B; or else, determining that the target video frame meets the reusing condition, and executing Step 210B.

Step 205B, sampling, according to the first position information, an edge contour of the target area in the first image to determine initial feature points.

In a possible implementation, sampling, according to the first position information, the edge contour of the target area in the first image to determine the initial feature points includes: in a case that the target area is an elliptical area, representing, according to the first position information, the target area in a polar coordinate to obtain an elliptical contour, where the first position information includes a vertex coordinate and/or a center point coordinate of the target area in the first image; and sampling, according to a preset polar angle interval, in the elliptical contour to obtain the initial feature points.

Step 206B, performing, according to the initial feature points determined based on the first position information, the optical flow tracking on the target video frame to obtain target feature points.

Step 207B, determining whether a coverage range of the target feature points on the edge contour of the target area is greater than or equal to a preset range, if so, executing Step 208B; or else, executing Step 209B.

In a case that the coverage range of the target feature points on the edge contour of the target area is greater than or equal to the preset range, executing Step 208B; or else, executing Step 209B.

Step 208B, fitting the target feature points to obtain position information of the target area in the target video frame.

Step 209B, determining, based on the target video frame, the position information of the target area in the target video frame.

Step 210B, determining the first position information as the position information of the target area in the target video frame.

Figure 5B:
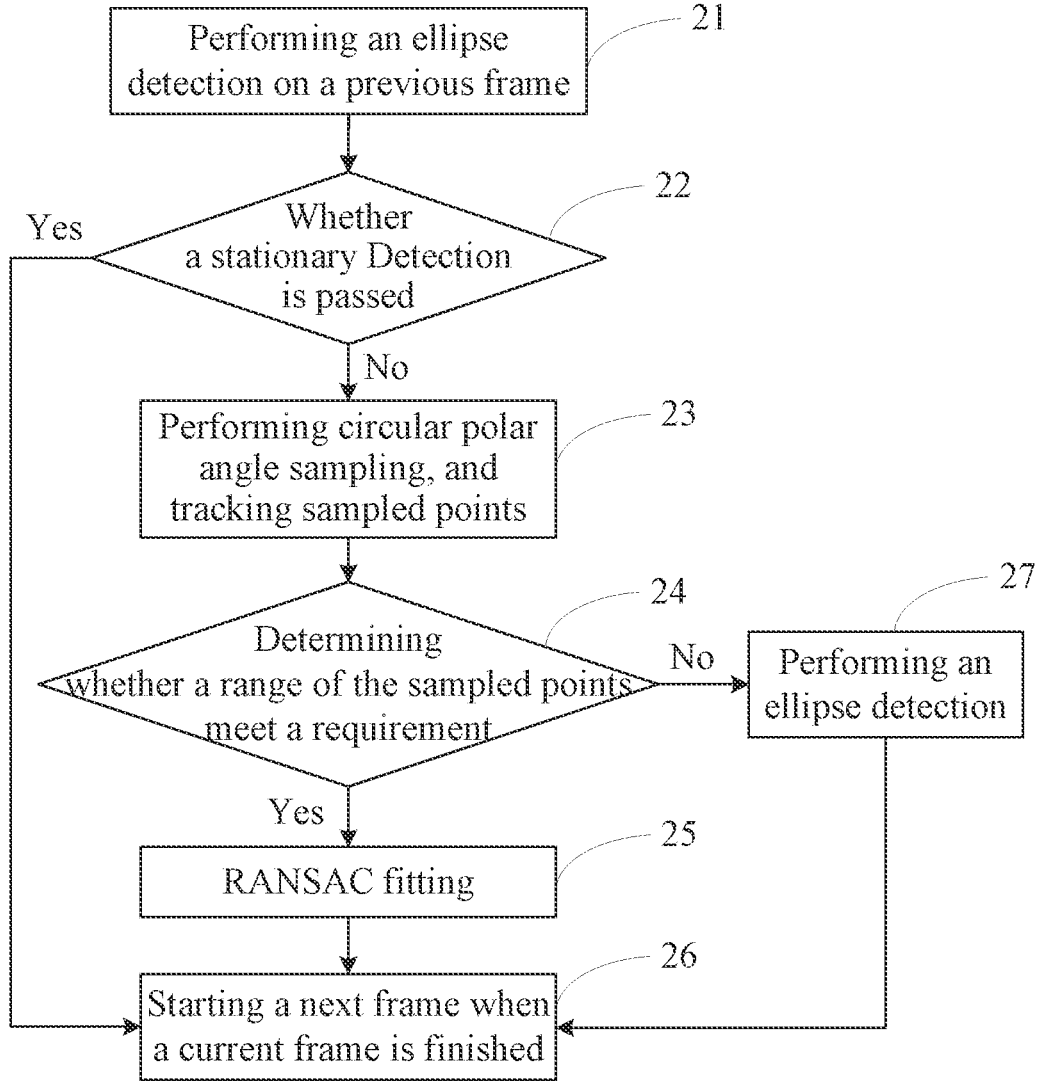
FIG. 5B is a schematic flowchart of another target tracking method provided by an embodiment of the present disclosure.

Next, a specific example will be used to further illustrate the target tracking method in the embodiment of the present disclosure. Illustratively, FIG. 5B is a schematic flowchart of another target tracking method provided by an embodiment of the present disclosure. A tracking process for a video may include the following. Step 21, performing an ellipse detection on a previous frame. The previous frame may be a first frame of the video, specifically, any ellipse detection method may be used to perform the detection to determine a position of an ellipse in the previous frame. Step 22, whether a stationary detection for a current frame is passed, if so, executing Step 26; or else, executing Step 23. Specifically, the FAST corner point detection is performed on the previous frame, and the KLT optical flow tracking is performed to the current frame based on a corner point of the previous frame. An average moving distance between matching points of the two adjacent frames is calculated. If the distance is smaller than 0.8, it indicates that the camera is basically in a stationary state and the stationary detection is passed. Then, the position of the ellipse in the current frame should be similar to that in the previous frame, and the position of the ellipse in the previous frame may be directly assigned to the current frame, and executing Step 26. If the distance is greater than 0.8, it indicates that the stationary detection is not passed, then executing Step 23. Step 23, performing circular polar angle sampling, and tracking sampled points. The elliptical equation of the previous frame is represented in the polar coordinate, and feature points on a circumference of the ellipse are sampled based on the polar angle, a point is collected every 5 degrees, so a total of 72 points is obtained; in the current frame image, the feature points obtained by sampling are subject to optical flow tracking, and the points that are successfully tracked are retained and points that are failed to be tracked are removed. Step 24, determining whether a range of the sampled points meets a requirement, if so, executing Step 25; or else, executing Step 27. If the distribution of the points that are successfully tracked on the circumference of the ellipse is greater than ¾ of the circumference of the ellipse, it is determined that the range of the sampled points meets the requirement, and executes Step 25. Or else, it is determined that the range of the sampled points does not meet the requirement, so the tracking is deemed to be failed, and executing Step 27. Step 25, performing RANSAC fitting. An ellipse fitting is performed according to the feature points, the ellipse fitting is completed by using a RANSAC manner, that is, randomly sampling 5 feature points from a point set each time, until an elliptical model of a largest interior point set is found. Step 26, starting a next frame when the current frame is finished. Step 27, performing ellipse detection. The ellipse detection is performed again on the current frame, after the position of the ellipse is determined, the process continues to Step 26 until the position of the ellipse is determined for each frame in the video.

In this solution, the optical flow tracking of feature points, the stationary detection of video frame sequences, and quality discrimination of ellipse tracking are used, the ellipse tracking for each image frame in the video can be completed quickly and accurately, without the need for detection for every video frame, reducing computational complexity and ensuring real-time performance of the target tracking.

According to the target tracking solution provided by the embodiment of the present, a first image in the target video is extracted, and first position information of a target area in the first image is determined; optical flow tracking is performed, according to initial feature points determined based on the first position information, on the target video frame to obtain target feature points, where the target video frame is an adjacent video frame of the first image in the target video; and the target feature points are fit to obtain the position information of the target area in the target video frame. By using the above technical solution, based on the detection of the target area of one video frame of the video, more accurate determination of the positions of the target area in other video frames can be implemented by tracking and fitting the feature points, thus avoiding the detection on every video frame, improving the computation efficiency of tracking, and achieving fast and accurate target recognition and tracking for each image frame in the video.

Figure 6:
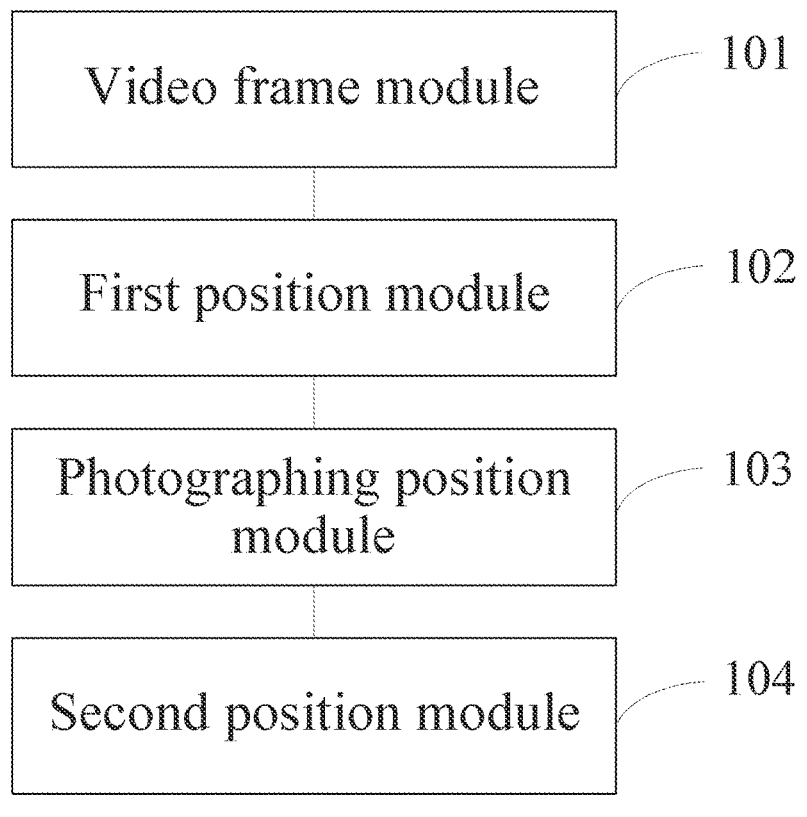
FIG. 6 is a schematic structure diagram of a target tracking apparatus provided by an embodiment of the present disclosure.

FIG. 6 is a schematic structure diagram of a target tracking apparatus provided by an embodiment of the present disclosure. The apparatus may be implemented by using software and/or hardware, and can generally be integrated into an electronic device. As shown in FIG. 6, the apparatus includes:

a video frame module 301, configured to acquire a target video frame;

a first position module 302, configured to determine, based on the target video frame, position information of a target area in the target video frame;

a photographing position module 303, configured to determine, in a case that a determination of the position information of the target area in the target video frame is failed, target photographing position information; and a second position module 304, configured to determine again, according to the target photographing position information and a camera projection algorithm, the position information of the target area in the target video frame.

In a possible implementation, when the target video frame is a video frame in a target video, the first position module 302 is specifically configured to: extract a first image in the target video, and determine first position information of the target area in the first image, where the target video frame is an adjacent video frame of the first image in the target video; the apparatus further includes a tracking module 305 configured to: perform, according to initial feature points determined based on the first position information, optical flow tracking on the target video frame to obtain target feature points; and the first position module 302 is specifically configured to: fit the target feature points to obtain the position information of the target area in the target video frame.

In a possible implementation, the tracking module 305 is configured to: sample, according to the first position information, an edge contour of the target area in the first image to determine the initial feature points.

In a possible implementation, the tracking module 305 is configured to: in a case that the target area is an elliptical area, represent, according to the first position information, the target area in a polar coordinate to obtain an elliptical contour, where the first position information includes a vertex coordinate and/or a center point coordinate of the target area in the first image; and sample, according to a preset polar angle interval, in the elliptical contour to obtain the initial feature points.

In a possible implementation, the tracking module 305 is specifically configured to: perform the optical flow tracking on the initial feature points in the target video frame, retain initial feature points that are successfully tracked as the target feature points, and remove initial feature points that are failed to be tracked.

In a possible implementation, the first position module 302 is configured to: in a case that a coverage range of the target feature points on an edge contour of the target area is greater than or equal to a preset range, fit the target feature points to obtain the position information of the target area in the target video frame.

In a possible implementation, the first position module 302 is further configured to: in a case that the coverage range of the target feature points on the edge contour of the target area is smaller than the preset range, perform detection on the target video frame using a preset detection algorithm to determine the position information of the target area in the target video frame.

In a possible implementation, the apparatus further includes a determining module 306 configured to: determine a change parameter of the target video frame relative to the first image. The tracking module 305 is specifically configured to: if the target video frame does not meet a reusing condition based on the change parameter, perform, according to the initial feature points determined based on the first position information, the optical flow tracking on the target video frame to obtain the target feature points.

In a possible implementation, the determining module 306 is specifically configured to: extract a first feature point in the first image; perform, according to the first feature point, the optical flow tracking on the target video frame to determine a second feature point, and determine a movement distance between the first feature point and the second feature point as the change parameter.

In a possible implementation, the determining module 306 is further configured to: if it is determined, based on the change parameter, that the target video frame meets the reusing condition, determine the first position information as the position information of the target area in the target video frame.

In a possible implementation, the photographing position module 303 is specifically configured to: determine, through a simultaneous localization and mapping algorithm, initial photographing position information in a first coordinate system; determine a target transformation relationship of the first coordinate system and a second coordinate system corresponding to the camera projection algorithm; and determine, according to the initial photographing position information and the target transformation relationship, the target photographing position information.

In a possible implementation, the photographing position module 303 is specifically configured to: determine, through the simultaneous localization and mapping algorithm and the camera projection algorithm, first photographing position information and second photographing position information of a detected video frame respectively, where the detected video frame is a video frame whose target area is successfully tracked; and determine, according to the first photographing position information and the second photographing position information of the detected video frame, the target transformation relationship.

In a possible implementation, the number of the detected video frames is one or multiple, when the number of the detected video frames is multiple, the target transformation relationship is an average value of transformation relationships corresponding to respective detected video frames, the target transformation relationship includes a transformation scale and a transformation translation.

In a possible implementation, the photographing position module 303 is specifically configured to: transform, based on the target transformation relationship, the initial photographing position information from information of the first coordinate system to information of the second coordinate system to obtain the target photographing position information.

In a possible implementation, in a case that a determination of the position information of the target area in the target video frame is successful, the photographing position module 303 is further configured to: determine attribute information of the target area in the target video frame, where the attribute information includes position information of the target area in the target video frame and dimension information of the target area; determine, according to the attribute information of the target area and the camera projection algorithm, the target photographing position information.

In a possible implementation, the photographing position module 303 is specifically configured to: input the attribute information of the target area into a projection equation of the camera projection algorithm to determine translation information from the photographing position to a target shape object corresponding to the target area in a world coordinate system, where the photographing position is a position where an apparatus for photographing the target video frame is located; perform, according to the translation information from the photographing position to the target shape object in the world coordinate system and position information of the target shape object in the world coordinate system, position solving to obtain the target photographing position information.

In a possible implementation, the position information of the target area in the projection equation is related to the dimension information of the target area, an internal parameter of the photographing apparatus, a rotation matrix from the coordinate system where the photographing position is located to the world coordinate system, and the position information of the origin of the world coordinate system in the coordinate system where the photographing position is located.

In a possible implementation, the translation information from the photographing position to the target shape object in the world coordinate system is related to the position information of the origin of the world coordinate system in the coordinate system where the photographing position is located.

In a possible implementation, the second position module 304 is configured to:

perform, according to the target photographing position information and position information of a target shape object corresponding to the target area, position solving to determine translation information from a photographing position to the target shape object, where the photographing position is a position where an apparatus for photographing the target video frame is located; and input the translation information from the photographing position to the target shape object into a projection equation of the camera projection algorithm to determine the position information of the target area in the target video frame.

In a possible implementation, the apparatus further include a normal vector module, configured to:

determine an initial normal vector in a plane where a target shape object corresponding to the target area is located, and determine a projection of the initial normal vector on a horizontal plane or a vertical plane as a target normal vector.

The target tracking apparatus provided by the embodiment of the present disclosure can execute the target tracking method provided by any previous embodiment of the present disclosure, and has corresponding function modules for executing the method and beneficial effects.

An embodiment of the present disclosure further provides a computer program product, including a computer program/instruction, when the computer program/instruction is executed, the target tracking method provided by any embodiment of the present disclosure is implemented.

Figure 7:
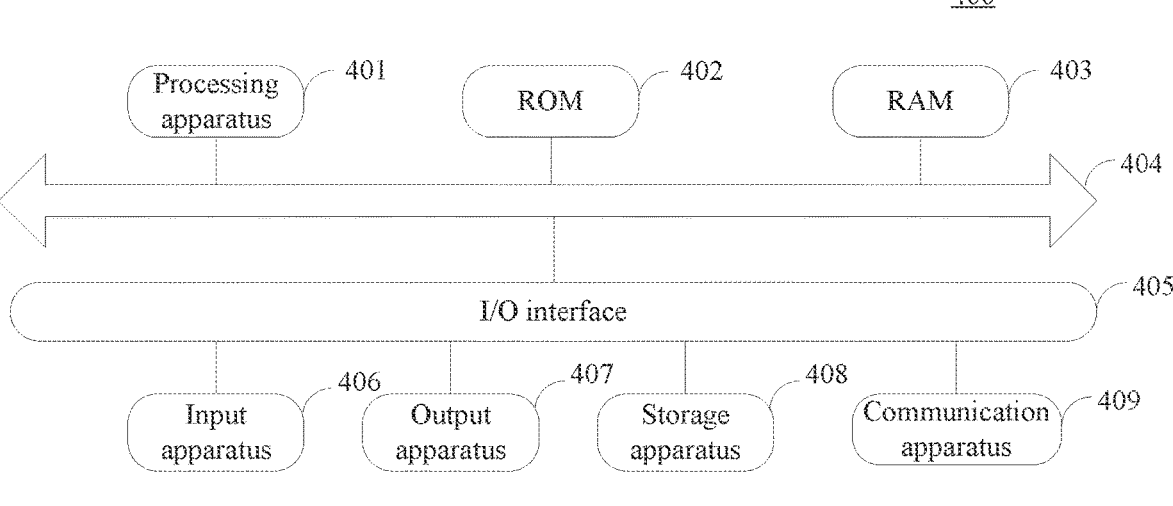
FIG. 7 is a schematic structure diagram of an electronic device provided by an embodiment of the present disclosure.

FIG. 7 is a schematic structure diagram of an electronic device provided by an embodiment of the present disclosure. The electronic device can execute the target tracking method provided by any previous embodiment of the present disclosure, and has a corresponding hardware and software for executing the method and corresponding beneficial effects. In the below, specifically referring to FIG. 7, which shows a schematic structural diagram suitable for implementing an electronic device 400 in the embodiment of the present disclosure. The electronic device 400 in the embodiment of the present disclosure may include but is not limited to a mobile terminal, such as a mobile phone, a laptop, a digital broadcast receiver, a personal digital assistant (PDA), a portable android device (PAD), a portable media player (PMP), a vehicle-mounted terminal (such as a vehicle-mounted navigation terminal), etc., and a fixed terminal, such as a digital TV, a desktop computer, etc. The electronic device shown in FIG. 7 is only an example and should not impose any limitations on functionality and the scope of use of the embodiment of the present disclosure.

As shown in FIG. 7, the electronic device 400 may include a processing apparatus (such as, a central processor, a graphics processor and the like) 401, which can execute various appropriate actions and processes according to a program stored in a read only memory (ROM) 402 or a program loaded into a random access memory (RAM) 403 from a storage apparatus 408. In the RAM 403, various programs and data necessary for the operation of the electronic device 400 are also stored. The processing apparatus 401, ROM 402 and RAM 403 are connected to each other through a bus 404. An input/output (I/O) interface 405 is also connected to the bus 404.

Typically, the following apparatus may be connected to the I/O interface 405: an input apparatus 406 including, for example, a touch screen, a touch pad, a keyboard, a mouse, a camera, a microphone, an accelerometer, a gyroscope and the like; an output apparatus 407 including, for example, a liquid crystal display (LCD), a speaker, a vibrator and the like; a storage apparatus 408 including, for example, a magnetic tape, a hard disk and like; and a communication apparatus 409. The communication apparatus 409 can allow the electronic device 400 to communicate wirelessly or wired with other devices to exchange data. While FIG. 7 shows the electronic device 400 with various apparatuses, it should be understood that not all of the illustrated apparatuses are required to be implemented or provided. More or fewer apparatuses may alternatively be implemented or provided.

Compared to the prior art, the technical solution provided by the embodiments of the present disclosure has following advantages: according to the target tracking method provided by the embodiments of the present disclosure, a target video frame is acquired; position information of a target area in the target video frame is determined based on the target video frame; in a case that a determination of the position information of the target area in the target video frame is failed, target photographing position information is determined, and the position information of the target area in the target video frame is determined again according to the target photographing position information and a camera projection algorithm. By using the above technical solution, after the tracking of the target area in the target video frame is failed, a position of the target area in the target video frame can be re-determined according to the photographing position determined based on a simultaneous localization and mapping algorithm, then recovery of tracking is achieved, the target tracking can also be achieved even when the camera moves fast, and robustness of tracking is improved.

In particular, according to the embodiments of the present disclosure, the processes described above with reference to the flowcharts may be implemented as a computer software program. For example, an embodiment of the present disclosure includes a computer program product including a computer program carried on a non-transitory computer readable medium, the computer program containing program codes for executing the methods illustrated in the flowcharts. In such embodiments, the computer program may be downloaded and installed from the network via the communication apparatus 409, or installed from the storage apparatus 408, or installed from the ROM 402. When the computer program is executed by the processing apparatus 401, the above functions defined in the target tracking methods of the embodiments of the present disclosure are executed.

It should be noted that, the above-mentioned computer readable medium in the present disclosure may be a computer readable signal medium or a computer readable storage medium, or any combination of the above two. The computer readable storage medium may be, but not limited to, for example, an electrical, magnetic, optical, electromagnetic, infrared, or semiconductor system, apparatus or device, or a combination of any of the above. More specific examples of the computer readable storage media may include, but are not limited to, an electrical connection with one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device or any suitable combination of the above. In the present disclosure, the computer readable storage medium may be any tangible medium in which the program is contained or stored, and the program can be used by or in conjunction with an instruction execution system, apparatus, or device. In the present disclosure, the computer readable signal medium may include a data signal propagated in a baseband or as a part of a carrier wave, and carries computer readable program codes therein. The propagated data signal may take a variety of forms, including but not limited to an electromagnetic signal, an optical signal or any suitable combination of the above. The computer readable signal medium may also be any computer readable medium other than the computer readable storage medium, the computer readable signal medium can transmit, propagate or transport the program for use by or in conjunction with the instruction execution system, apparatus or device. Program codes contained in the computer readable medium may be transmitted by any suitable medium, which includes, but not limited to, an electrical wire, an optical fiber cable, a radio frequency (RF for short) or the like, or any suitable combination of the above.

In some implementations, a client and a server can perform communications using any currently known or future developed network protocol such as HyperText Transfer Protocol (HTTP), and can interconnect with any form or medium of digital data communication (such as a communication network). Examples of the communication network include a local area network (LAN), a wide area network (WAN), an internet work (such as the Internet), and an end-to-end network (such as ad hoc end-to-end network), as well as any currently known or future developed networks.

The computer readable medium may be contained in the above electronic device; or may exist alone without being assembled into the electronic device.

The above computer readable medium carries one or more programs, and when the one or more programs are executed by the electronic device, the electronic device is enabled to: acquire a target video frame; determine, based on the target video frame, position information of a target area in the target video frame; determine, in a case that a determination of the position information of the target area in the target video frame is failed, target photographing position information, and determine again, according to the target photographing position information and a camera projection algorithm, the position information of the target area in the target video frame.

Computer program codes for performing operations of the present disclosure may be written in one or more programming languages or a combination thereof, the above programming language includes but not limited to object-oriented programming languages, such as Java, Smalltalk, C++, and also includes conventional procedural programming languages, such as the "C" language or similar programming languages. The program codes may be executed entirely on a user's computer, partly on the user's computer, as a stand-alone software package, partly on the user's computer and partly on a remote computer, or entirely on the remote computer or a server. In a case involving the remote computer, the remote computer may be connected to the user's computer through any kind of network, including the local area network (LAN) or wide area network (WAN), or may be connected to an external computer (for example, connected through the Internet by using an Internet service provider).

Flowcharts and block diagrams in the drawings illustrate possible architectures, functionalities, and operations of systems, methods, and computer program products according to various embodiments of the present disclosure. In this point, each block in the flowchart or the block diagram may represent a module, a program segment or a portion of codes, and the module, program segment or portion of codes contains one or more executable instructions for implementing the specified logical function. It should also be noted that, in some alternative implementations, the functions indicated in the blocks may occur in an order different from that indicated in the figures. For example, two blocks shown in succession may, in fact, be executed substantially concurrently, or may sometimes be executed in the reverse order, which is depended upon the functionality involved. It is also noted that each block in the block diagrams and/or flowcharts, and combinations of blocks in the block diagrams and/or flowcharts, can be implemented in a dedicated hardware-based system that performs specified functions or operations, or can be implemented in a combination of dedicated hardware and computer instructions.

Units involved that are described in the embodiments of the present disclosure may be implemented in a software manner, and may also be implemented in a hardware manner. The name of a unit does not constitute a limitation of the unit itself under certain circumstances.

The functions above described herein may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on a chip (SOC), a complex programmable logical device (CPLD) and the like.

In the context of the present disclosure, a machine readable medium may be a tangible medium that may contain or store a program for use by or in conjunction with the instruction executable system, apparatus, or device. The machine-readable medium may be a machine-readable signal medium or a machine-readable storage medium. The machine readable medium may include, but not limited to, an electronic, magnetic, optical, electromagnetic, infrared or semiconductor system, apparatus or device, or any suitable combination of the above. More specific examples of the machine readable storage medium would include one or more wires-based electrical connections, portable computer disks, hard disks, random access memory (RAM), read only memory (ROM), erasable programmable read-only memory (EPROM or flash memory), fiber optics, compact disk read only memory (CD-ROM), optical storage devices, magnetic storage devices, or any suitable combination of the above.

According to one or more embodiments of the present disclosure, the present disclosure provides a target tracking method, including:

acquiring a target video frame;

determining, based on the target video frame, position information of a target area in the target video frame;

in a case that a determination of the position information of the target area in the target video frame is failed, determining target photographing position information, and determining again, according to the target photographing position information and a camera projection algorithm, the position information of the target area in the target video frame.

According to one or more embodiments of the present disclosure, when the target video frame is a video frame in the target video, the determining, based on the target video frame, the position information of the target area in the target video frame may include:

extracting a first image in the target video, and determining first position information of the target area in the first image, where the target video frame is an adjacent video frame of the first image in the target video;

performing, according to initial feature points determined based on the first position information, optical flow tracking on the target video frame to obtain target feature points; and fitting the target feature points to obtain the position information of the target area in the target video frame.

According to one or more embodiments of the present disclosure, in the target tracking method provided by the present disclosure, before performing, according to the initial feature points determined based on the first position information, the optical flow tracking on the target video frame to obtain the target feature points, the method further includes: sampling, according to the first position information, an edge contour of the target area in the first image to determine the initial feature points.

According to one or more embodiments of the present disclosure, in the target tracking method provided by the present disclosure, the sampling, according to the first position information, the edge contour of the target area in the first image to determine the initial feature points includes:

in a case that the target area is an elliptical area, representing, according to the first position information, the target area in a polar coordinate to obtain an elliptical contour; and sampling, according to a preset polar angle interval, in the elliptical contour to obtain the initial feature points.

According to one or more embodiments of the present disclosure, in the target tracking method provided by the present disclosure, the performing, according to the initial feature points determined based on the first position information, the optical flow tracking on the target video frame to obtain the target feature points includes:

performing the optical flow tracking on the initial feature points in the target video frame, retaining initial feature points that are successfully tracked as the target feature points, and removing initial feature points that are failed to be tracked.

According to one or more embodiments of the present disclosure, in the target tracking method provided by the present disclosure, the fitting the target feature points to obtain the position information of the target area in the target video frame includes:

in a case that a coverage range of the target feature points on an edge contour of the target area is greater than or equal to a preset range, fitting the target feature points to obtain the position information of the target area in the target video frame.

According to one or more embodiments of the present disclosure, the target tracking method provided by the present disclosure further includes:

in a case that the coverage range of the target feature points on the edge contour of the target area is smaller than the preset range, performing detection on the target video frame using a preset detection algorithm to determine the position information of the target area in the target video frame.

According to one or more embodiments of the present disclosure, in the target tracking method provided by the present disclosure, after determining the first position information of the target area in the first image, the method further includes:

determining a change parameter of the target video frame relative to the first image;

the performing, according to the initial feature points determined based on the first position information, the optical flow tracking on the target video frame to obtain the target feature points includes:

if it is determined, based on the change parameter, that the target video frame does not meet a reusing condition, performing, according to the initial feature points determined based on the first position information, the optical flow tracking on the target video frame to obtain the target feature points.

According to one or more embodiments of the present disclosure, in the target tracking method provided by the present disclosure, the determining the change parameter of the target video frame relative to the first image includes:

extracting a first feature point in the first image;

performing, according to the first feature point, the optical flow tracking on the target video frame to determine a second feature point; and determining a movement distance between the first feature point and the second feature point as the change parameter.

According to one or more embodiments of the present disclosure, the target tracking method provided by the present disclosure further includes:

if it is determined, based on the change parameter, that the target video frame meets the reusing condition, determining the first position information as the position information of the target area in the target video frame.

According to one or more embodiments of the present disclosure, in the target tracking method provided by the present disclosure, the determining the target photographing position information includes:

determining, through a simultaneous localization and mapping algorithm, initial photographing position information in a first coordinate system;

determining a target transformation relationship of the first coordinate system and a second coordinate system corresponding to the camera projection algorithm; and determining, according to the initial photographing position information and the target transformation relationship, the target photographing position information.

According to one or more embodiments of the present disclosure, in the target tracking method provided by the present disclosure, the determining the target transformation relationship of the first coordinate system and the second coordinate system corresponding to the camera projection algorithm includes:

determining, through the simultaneous localization and mapping algorithm and the camera projection algorithm, first photographing position information and second photographing position information of a detected video frame respectively, where the detected video frame is a video frame whose target area is successfully tracked; and determining, according to the first photographing position information and the second photographing position information of the detected video frame, the target transformation relationship.

According to one or more embodiments of the present disclosure, in the target tracking method provided by the present disclosure, a number of the detected video frames is one or multiple, when the number of the detected video frames is multiple, the target transformation relationship is an average value of transformation relationships corresponding to respective detected video frames, the target transformation relationship includes a transformation scale and a transformation translation.

According to one or more embodiments of the present disclosure, in the target tracking method provided by the present disclosure, the determining, according to the initial photographing position information and the target transformation relationship, the target photographing position information includes:

transforming, based on the target transformation relationship, the initial photographing position information from information of the first coordinate system to information of the second coordinate system to obtain the target photographing position information.

According to one or more embodiments of the present disclosure, the target tracking method provided by the present disclosure further includes:

in a case that a determination of the position information of the target area in the target video frame is successful, performing operations of:

determining attribute information of the target area in the target video frame, where the attribute information includes position information of the target area in the target video frame and dimension information of the target area; and determining, according to the attribute information of the target area and the camera projection algorithm, the target photographing position information.

According to one or more embodiments of the present disclosure, in the target tracking method provided by the present disclosure, the determining, according to the attribute information of the target area and the camera projection algorithm, the target photographing position information includes:

inputting the attribute information of the target area into a projection equation of the camera projection algorithm to determine translation information from a photographing position to a target shape object corresponding to the target area in a world coordinate system, where the photographing position is a position where an apparatus for photographing the target video frame is located; and performing, according to the translation information from the photographing position to the target shape object in the world coordinate system and position information of the target shape object in the world coordinate system, position solving to obtain the target photographing position information.

According to one or more embodiments of the present disclosure, in the target tracking method provided by the present disclosure, the determining again, according to the target photographing position information and the camera projection algorithm, the position information of the target area in the target video frame includes:

performing, according to the target photographing position information and position information of the target shape object corresponding to the target area, position solving to determine translation information from the photographing position to the target shape object, where the photographing position is a position where an apparatus for photographing the target video frame is located; and inputting the translation information from the photographing position to the target shape object into a projection equation of the camera projection algorithm to determine the position information of the target area in the target video frame.

According to one or more embodiments of the present disclosure, the target tracking method provided by the present disclosure further includes:

determining an initial normal vector in a plane where the target shape object corresponding to the target area is located, and determining a projection of the initial normal vector on a horizontal plane or a vertical plane as a target normal vector.

According to one or more embodiments of the present disclosure, the present disclosure provides a target tracking apparatus, including:

a video frame module, configured to acquire a target video frame;

a first position module, configured to determine, based on the target video frame, position information of a target area in the target video frame;

a photographing position module, configured to determine, if a determination of the position information of the target area in the target video frame is failed, target photographing position information; and a second position module, configured to determine again, according to the target photographing position information and a camera projection algorithm, the position information of the target area in the target video frame.

According to one or more embodiments of the present disclosure, when the target video frame is a video frame in a target video, the first position module is specifically configured to: extract a first image in the target video, and determine first position information of the target area in the first image, where the target video frame is an adjacent video frame of the first image in the target video; the apparatus further includes a tracking module configured to: perform, according to initial feature points determined based on the first position information, optical flow tracking on the target video frame to obtain target feature points; and the first position module is further configured to: fit the target feature points to obtain the position information of the target area in the target video frame.

According to one or more embodiments of the present disclosure, the tracking module is configured to: sample, according to the first position information, an edge contour of the target area in the first image to determine the initial feature points.

According to one or more embodiments of the present disclosure, the tracking module is configured to: in a case that the target area is an elliptical area, represent, according to the first position information, the target area in a polar coordinate to obtain an elliptical contour; and sample, according to a preset polar angle interval, in the elliptical contour to obtain the initial feature points.

According to one or more embodiments of the present disclosure, the tracking module is specifically configured to: perform the optical flow tracking on the initial feature points in the target video frame, retain initial feature points that are successfully tracked as the target feature points, and remove initial feature points that are failed to be tracked.

According to one or more embodiments of the present disclosure, the first position module is configured to: in a case that a coverage range of the target feature points on an edge contour of the target area is greater than or equal to a preset range, fit the target feature points to obtain the position information of the target area in the target video frame.

According to one or more embodiments of the present disclosure, the first position module is further configured to: in a case that the coverage range of the target feature points on the edge contour of the target area is smaller than the preset range, perform detection on the target video frame using a preset detection algorithm to determine the position information of the target area in the target video frame.

According to one or more embodiments of the present disclosure, the apparatus further includes a determining module configured to: determine a change parameter of the target video frame relative to the first image. The tracking module is specifically configured to: if it is determined, based on the change parameter, that the target video frame does not meet a reusing condition, perform, according to the initial feature points determined based on the first position information, the optical flow tracking on the target video frame to obtain the target feature points.

According to one or more embodiments of the present disclosure, the determining module is specifically configured to: extract a first feature point in the first image; perform, according to the first feature point, the optical flow tracking on the target video frame to determine a second feature point, and determine a movement distance between the first feature point and the second feature point as the change parameter.

According to one or more embodiments of the present disclosure, the determining module is further configured to: if it is determined, based on the change parameter, that the target video frame meets the reusing condition, determine the first position information as the position information of the target area in the target video frame.

According to one or more embodiments of the present disclosure, the photographing position module is configured to: determining, through a simultaneous localization and mapping algorithm, initial photographing position information in a first coordinate system; determining a target transformation relationship of the first coordinate system and a second coordinate system corresponding to the camera projection algorithm; and determining, according to the initial photographing position information and the target transformation relationship, the target photographing position information.

According to one or more embodiments of the present disclosure, the photographing position module is configured to: determine, through the simultaneous localization and mapping algorithm and the camera projection algorithm, first photographing position information and second photographing position information of a detected video frame respectively, where the detected video frame is a video frame whose target area is successfully tracked; and determine, according to the first photographing position information and the second photographing position information of the detected video frame, the target transformation relationship.

According to one or more embodiments of the present disclosure, a number of the detected video frames is one or multiple, when the number of the detected video frames is multiple, the target transformation relationship is an average value of transformation relationships corresponding to respective detected video frames, the target transformation relationship includes a transformation scale and a transformation translation.

According to one or more embodiments of the present disclosure, the photographing position module is configured to: transform, based on the target transformation relationship, the initial photographing position information from information of the first coordinate system to information of the second coordinate system to obtain the target photographing position information.

According to one or more embodiments of the present disclosure, in a case that a determination of the position information of the target area in the target video frame is successful, the photographing position module is further configured to: determine attribute information of the target area in the target video frame, where the attribute information includes position information of the target area in the target video frame and dimension information of the target area; and determine, according to the attribute information of the target area and the camera projection algorithm, the target photographing position information.

According to one or more embodiments of the present disclosure, the photographing position module is specifically configured to: input the attribute information of the target area into a projection equation of the camera projection algorithm to determine translation information from a photographing position to a target shape object corresponding to the target area in a world coordinate system, where the photographing position is a position where an apparatus for photographing the target video frame is located; and perform, according to the translation information from the photographing position to the target shape object in the world coordinate system and position information of the target shape object in the world coordinate system, position solving to obtain the target photographing position information.

According to one or more embodiments of the present disclosure, the position information of the target area in the projection equation is related to the dimension information of the target area, an internal parameter of the photographing apparatus, a rotation matrix from the coordinate system where the photographing position is located to the world coordinate system, and the position information of the origin of the world coordinate system in the coordinate system where the photographing position is located.

According to one or more embodiments of the present disclosure, the translation information from the photographing position to the target shape object in the world coordinate system is related to the position information of the origin of the world coordinate system in the coordinate system where the photographing position is located.

According to one or more embodiments of the present disclosure, in the target tracking apparatus provided by the present disclosure, the second position module is configured to:

perform, according to the target photographing position information and position information of a target shape object corresponding to the target area, position solving to determine translation information from a photographing position to the target shape object, where the photographing position is a position where an apparatus for photographing the target video frame is located; and input the translation information from the photographing position to the target shape object into a projection equation of the camera projection algorithm to determine the position information of the target area in the target video frame.

According to one or more embodiments of the present disclosure, in the target tracking apparatus provided by the present disclosure, the apparatus further includes a normal vector configured to:

determine an initial normal vector in a plane where a target shape object corresponding to the target area is located, and determining a projection of the initial normal vector on a horizontal plane or a vertical plane as a target normal vector.

According to one or more embodiments of the present disclosure, the present disclosure provides an electronic device, including:

a processor; and a memory configured to store instructions executable by the processor;

where the processor is configured to read the instructions and execute the instructions to implement any target tracking method as provided by the present disclosure.

According to one or more embodiments of the present disclosure, the present disclosure further provides a computer readable storage medium, the storage medium stores a computer program, the computer program is configured to enable a processor to execute any target tracking method as provided by the present disclosure.

According to one or more embodiments of the present disclosure, the present disclosure further provides a computer program product, including a computer program, the computer program is configured to enable a processor to execute any target tracking method as provided by the present disclosure.

According to one or more embodiments of the present disclosure, the present disclosure further provides a computer program, the computer program is configured to enable a processor to execute any target tracking method as provided by the present disclosure.

The above description is merely preferred embodiments of the present disclosure and an illustration of technical principles employed. Those skilled in the art should understand that the disclosure scope involved in the present disclosure is not limited to technical solutions formed by a specific combination of the above mentioned technical features, and should also cover other technical solutions formed by any combination of the above technical features or their equivalents without departing from the above disclosed concept, such as a technical solution formed by replacing the above technical features with the technical features disclosed in the present disclosure (but not limited to) with similar functions.

Additionally, although respective operations are described in a particular order, this should not be construed as requiring that the operations be performed in the shown particular order or executed in a sequential order. Under a certain circumstance, multitasking and parallel processing may be advantageous. Likewise, although several specific implementations are contained in the above discussion, these should not be construed as limitations on the scope of the present disclosure. Certain features that are described in the context of separate embodiments can also be implemented in combination in a single embodiment. Conversely, various features that are described in the context of the single embodiment can also be implemented in multiple embodiments separately or in any suitable sub-combination.

Although the subject matters have been described in language specific to structured features and/or methodological logical acts, it is to be understood that the subject matters defined in the appended claims are not necessarily limited to specific features or actions described above. Rather, the specific features and actions described above are merely exemplarily forms for implementing the claims.

What is claimed is:

1. A target tracking method, comprising:
acquiring a target video frame;
determining, based on the target video frame, position information of a target area in the target video frame;
in a case that a determination of the position information of the target area in the target video frame fails, determining target photographing position information, and determining again, according to the target photographing position information and a camera projection algorithm, the position information of the target area in the target video frame;
in a case that a determination of the position information of the target area in the target video frame is successful, performing operations of:
determining attribute information of the target area in the target video frame, wherein the attribute information comprises the position information of the target area in the target video frame and dimension information of the target area;
inputting the attribute information of the target area into a projection equation of the camera projection algorithm to determine translation information from a photographing position to a target shape object corresponding to the target area in a world coordinate system, wherein the photographing position is a position where an apparatus for photographing the target video frame is located; and
performing, according to the translation information from the photographing position to the target shape object in the world coordinate system and position information of the target shape object in the world coordinate system, position solving to obtain the target photographing position information.

2. The method according to claim 1, wherein when the target video frame is a video frame in a target video, the determining, based on the target video frame, the position information of the target area in the target video frame comprises:

extracting a first image in the target video, and determining first position information of the target area in the first image, wherein the target video frame is an adjacent video frame of the first image in the target video;
performing, according to initial feature points determined based on the first position information, optical flow tracking on the target video frame to obtain target feature points; and
fitting the target feature points to obtain the position information of the target area in the target video frame.

3. The method according to claim 2, wherein before performing, according to the initial feature points determined based on the first position information, the optical flow tracking on the target video frame to obtain the target feature points, the method further comprises:
sampling, according to the first position information, an edge contour of the target area in the first image to determine the initial feature points.

4. The method according to claim 3, wherein the sampling, according to the first position information, the edge contour of the target area in the first image to determine the initial feature points comprises:
in a case that the target area is an elliptical area, representing, according to the first position information, the target area in a polar coordinate to obtain an elliptical contour; and
sampling, according to a preset polar angle interval, in the elliptical contour to obtain the initial feature points.

5. The method according to claim 2, wherein the performing, according to the initial feature points determined based on the first position information, the optical flow tracking on the target video frame to obtain the target feature points comprises:
performing the optical flow tracking on the initial feature points in the target video frame, retaining initial feature points that are successfully tracked as the target feature points, and removing initial feature points that have not been successfully tracked.

6. The method according to claim 2, wherein the fitting the target feature points to obtain the position information of the target area in the target video frame comprises:
in a case that a coverage range of the target feature points on an edge contour of the target area is greater than or equal to a preset range, fitting the target feature points to obtain the position information of the target area in the target video frame.

7. The method according to claim 6, further comprising:
in a case that the coverage range of the target feature points on the edge contour of the target area is smaller than the preset range, performing detection on the target video frame using a preset detection algorithm to determine the position information of the target area in the target video frame.

8. The method according to claim 2, wherein after determining the first position information of the target area in the first image, the method further comprises:
determining a change parameter of the target video frame relative to the first image;
the performing, according to the initial feature points determined based on the first position information, the optical flow tracking on the target video frame to obtain the target feature points comprises:
in response to a determination, based on the change parameter, that the target video frame does not meet a reusing condition, performing, according to the initial feature points determined based on the first position information, the optical flow tracking on the target video frame to obtain the target feature points.

9. The method according to claim 8, wherein the determining the change parameter of the target video frame relative to the first image comprises:

extracting a first feature point in the first image;

performing, according to the first feature point, the optical flow tracking on the target video frame to determine a second feature point; and determining a movement distance between the first feature point and the second feature point as the change parameter.

10. The method according to claim 8, further comprising:

in response to a determination, based on the change parameter, that the target video frame meets the reusing condition, determining the first position information as the position information of the target area in the target video frame.

11. The method according to claim 1, wherein the determining the target photographing position information comprises:

determining, through a simultaneous localization and mapping algorithm, initial photographing position information in a first coordinate system;

determining a target transformation relationship of the first coordinate system and a second coordinate system corresponding to the camera projection algorithm; and determining, according to the initial photographing position information and the target transformation relationship, the target photographing position information.

12. The method according to claim 11, wherein the determining the target transformation relationship of the first coordinate system and the second coordinate system corresponding to the camera projection algorithm comprises:

determining, through the simultaneous localization and mapping algorithm and the camera projection algorithm, first photographing position information and second photographing position information of a detected video frame respectively, wherein the detected video frame is a video frame whose target area is successfully tracked; and determining, according to the first photographing position information and the second photographing position information of the detected video frame, the target transformation relationship.

13. The method according to claim 12, wherein a number of the detected video frames is one or multiple, when the number of the detected video frames is multiple, the target transformation relationship is an average value of transformation relationships corresponding to respective detected video frames, the target transformation relationship comprises a transformation scale and a transformation translation.

14. The method according to claim 11, wherein the determining, according to the initial photographing position information and the target transformation relationship, the target photographing position information comprises:

transforming, based on the target transformation relationship, the initial photographing position information from information of the first coordinate system to information of the second coordinate system to obtain the target photographing position information.

15. The method according to claim 1, wherein the determining again, according to the target photographing position information and the camera projection algorithm, the position information of the target area in the target video frame comprises:

performing, according to the target photographing position information and position information of the target shape object corresponding to the target area, position solving to determine the translation information from the photographing position to the target shape object; and inputting the translation information from the photographing position to the target shape object into the projection equation of the camera projection algorithm to determine the position information of the target area in the target video frame.

16. The method according to claim 1, further comprising:

determining an initial normal vector in a plane where a target shape object corresponding to the target area is located, and determining a projection of the initial normal vector on a horizontal plane or a vertical plane as a target normal vector.

17. An electronic device, comprising:

a processor; and a memory configured to store instructions executable by the processor;

wherein the processor is configured to read the instructions and execute the instructions to implement following steps:

acquiring a target video frame;

determining, based on the target video frame, position information of a target area in the target video frame;

in a case that a determination of the position information of the target area in the target video frame is failed, determining target photographing position information, and determining again, according to the target photographing position information and a camera projection algorithm, the position information of the target area in the target video frame;

in a case that a determination of the position information of the target area in the target video frame is successful, performing operations of:

determining attribute information of the target area in the target video frame, wherein the attribute information comprises the position information of the target area in the target video frame and dimension information of the target area;

inputting the attribute information of the target area into a projection equation of the camera projection algorithm to determine translation information from a photographing position to a target shape object corresponding to the target area in a world coordinate system, wherein the photographing position is a position where an apparatus for photographing the target video frame is located; and performing, according to the translation information from the photographing position to the target shape object in the world coordinate system and position information of the target shape object in the world coordinate system, position solving to obtain the target photographing position information.

18. A non-transitory computer readable storage medium, wherein, the storage medium stores a computer program, the computer program is configured to execute following steps:

acquiring a target video frame;

determining, based on the target video frame, position information of a target area in the target video frame;

in a case that a determination of the position information of the target area in the target video frame fails, determining target photographing position information, and determining again, according to the target photographing position information and a camera projection algorithm, the position information of the target area in the target video frame;

in a case that a determination of the position information of the target area in the target video frame is successful, performing operations of:

determining attribute information of the target area in the target video frame, wherein the attribute information comprises the position information of the target area in the target video frame and dimension information of the target area;

inputting the attribute information of the target area into a projection equation of the camera projection algorithm to determine translation information from a photographing position to a target shape object corresponding to the target area in a world coordinate system, wherein the photographing position is a position where an apparatus for photographing the target video frame is located; and performing, according to the translation information from the photographing position to the target shape object in the world coordinate system and position information of the target shape object in the world coordinate system, position solving to obtain the target photographing position information.

* * * * *